United States Patent [19]

Miura

[11] Patent Number: 5,754,307
[45] Date of Patent: May 19, 1998

[54] DATA COMMUNICATION APPARATUS AND METHOD OF MANAGING RECEIVED DATA

[75] Inventor: Shigeo Miura, Tokyo, Japan

[73] Assignee: Canon Kabushiki Kaisha, Tokyo, Japan

[21] Appl. No.: 476,282

[22] Filed: Jun. 7, 1995

Related U.S. Application Data

[63] Continuation of Ser. No. 280,138, Jul. 25, 1994, which is a continuation of Ser. No. 861,762, Apr. 1, 1992.

[30] Foreign Application Priority Data

| Apr. 3, 1991 | [JP] | Japan | 3-070713 |
| May 2, 1991 | [JP] | Japan | 3-100647 |

[51] Int. Cl.⁶ .......................... H04N 1/00
[52] U.S. Cl. .............. 358/403; 358/404; 358/444
[58] Field of Search .............................. 358/403, 404, 358/444, 401, 407, 434, 435, 436, 438, 439, 440, 442; 379/100

[56] References Cited

U.S. PATENT DOCUMENTS

| 4,717,967 | 1/1988 | Yoshida | 358/296 |
| 4,719,514 | 1/1988 | Kurahayashi | 358/261 |
| 4,785,355 | 11/1988 | Matsumoto | 358/434 |
| 4,821,107 | 4/1989 | Naito et al. | 358/440 |
| 4,827,349 | 5/1989 | Ogata et al. | 358/434 |
| 4,878,123 | 10/1989 | Miura | 358/401 |
| 4,900,902 | 2/1990 | Sakakibara | 235/375 |
| 4,994,926 | 2/1991 | Gordon et al. | 358/440 |

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

An object of the invention is to provide a data communication apparatus in which image data is managed upon being stored on an unloadable external storage medium. Another object of the invention is to provide a data communication apparatus, as well as a method of managing image data, in which a floppy disk on which image information has been stored is managed in the same fashion among a plurality of apparatus. There is provided a data communication apparatus characterized in that management data for received data managed by the data communication apparatus which has received the data is stored in the external storage device, thereby making it possible to manage output of the data by another apparatus. Further, there is provided a received-data managing method in a reception system characterized in that the first apparatus stores information, which is capable of being communicated to the first apparatus itself, on the external storage medium along with the received data, and the second apparatus, which has outputted the received data, transmits results of output, as well as information capable of identifying the first apparatus itself, to the first apparatus based upon information capable of being communicated to the first apparatus.

110 Claims, 16 Drawing Sheets

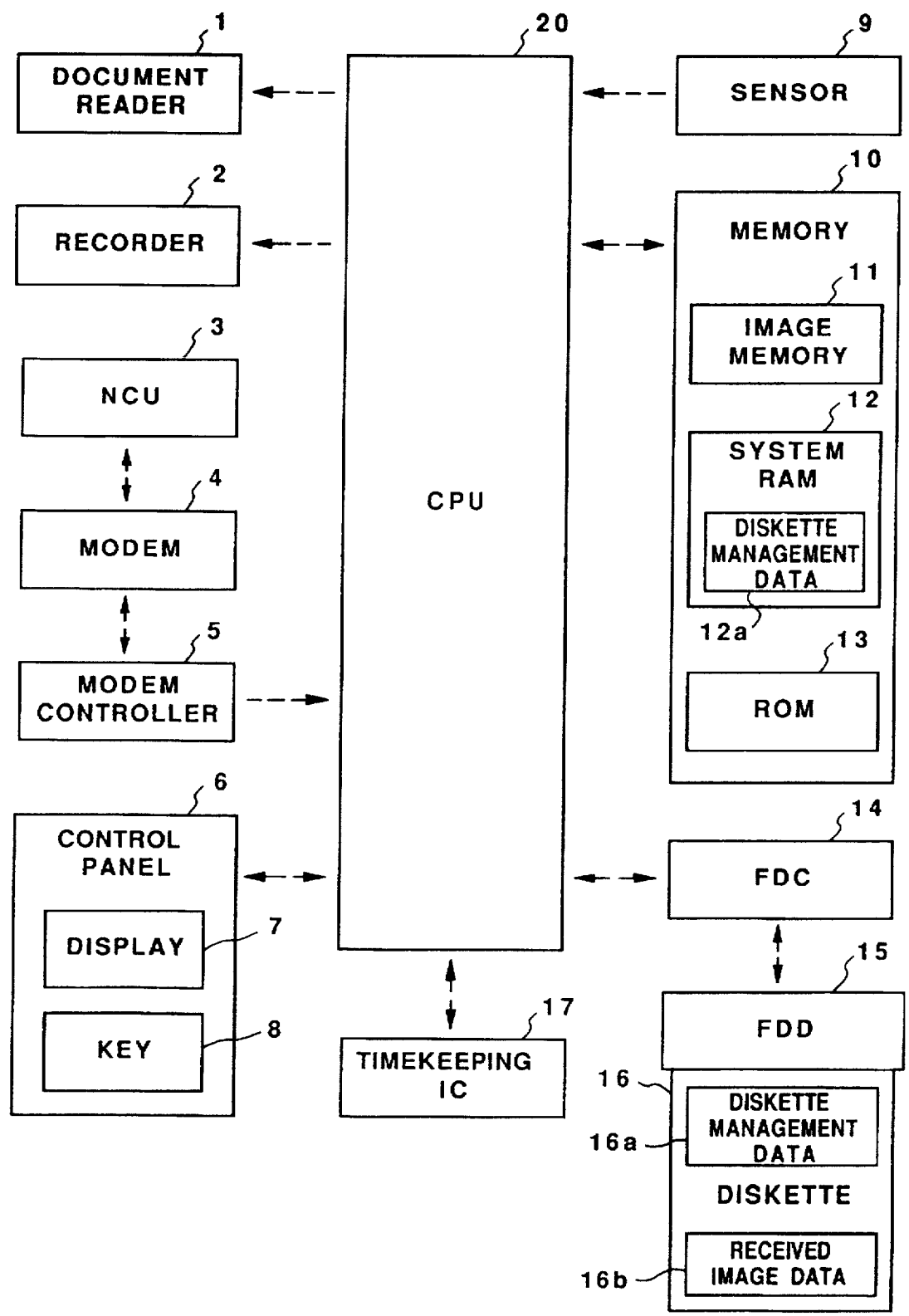
F I G. 1

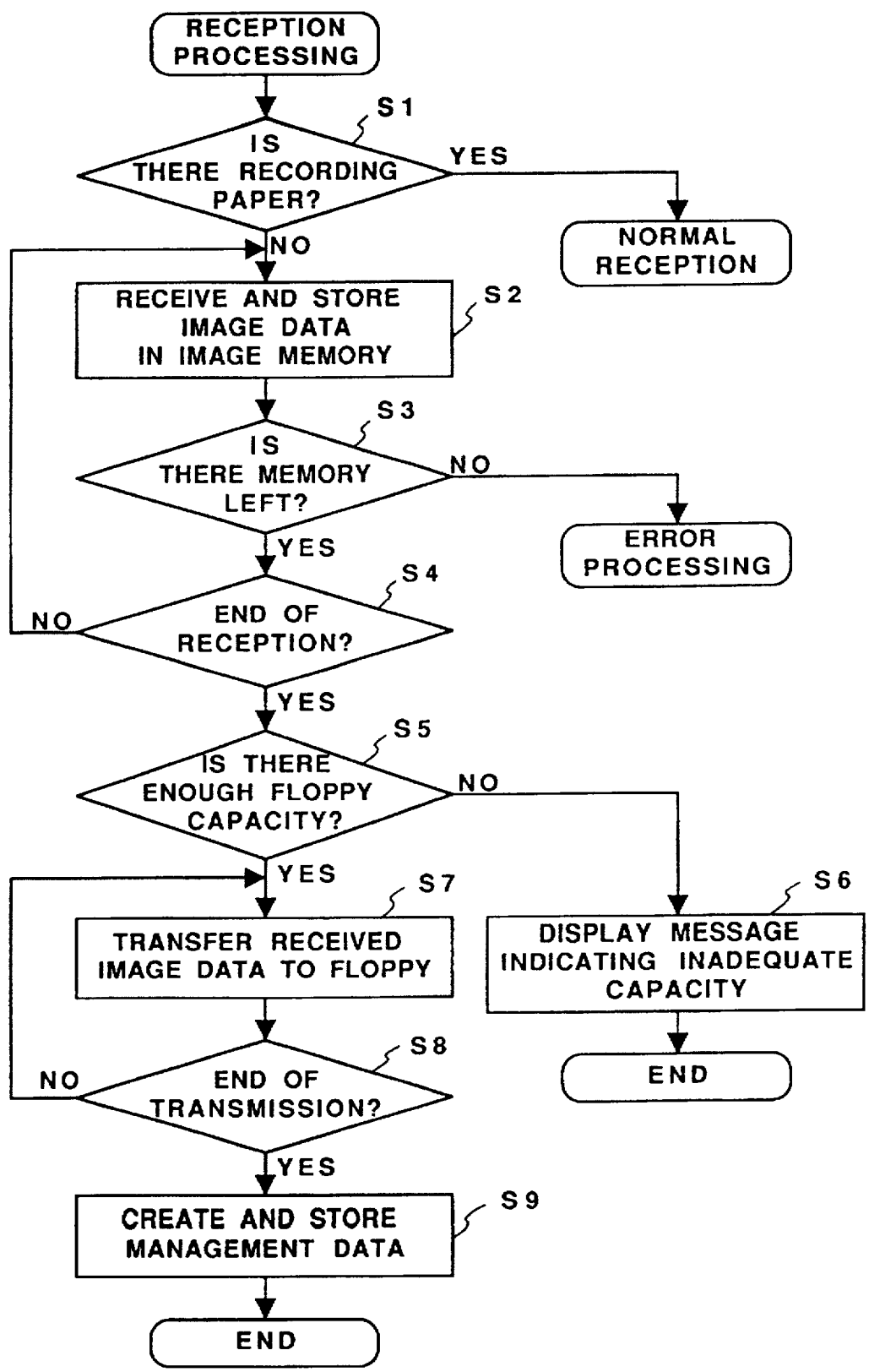
F I G. 3

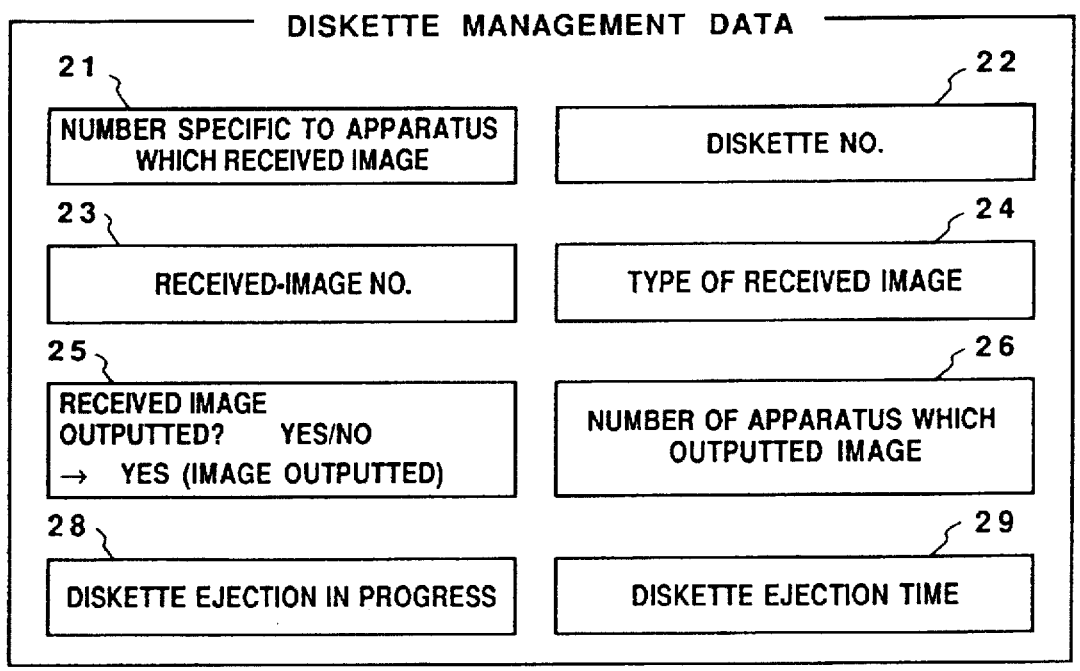
F I G. 10

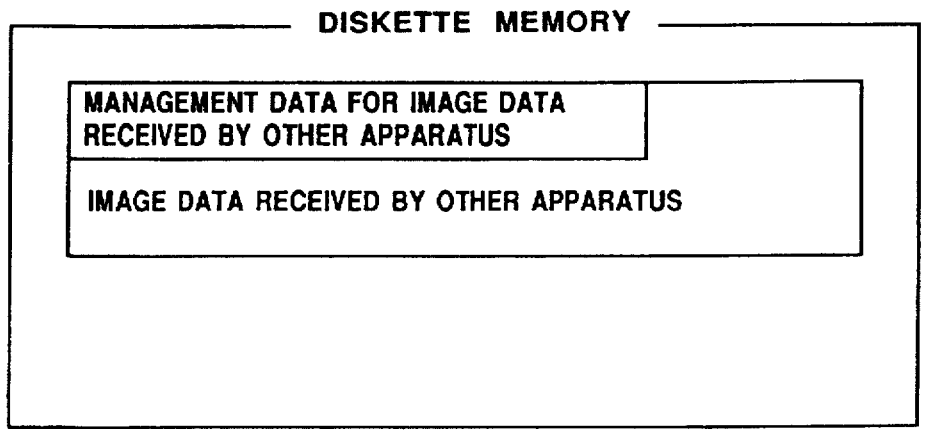
F I G. 11A
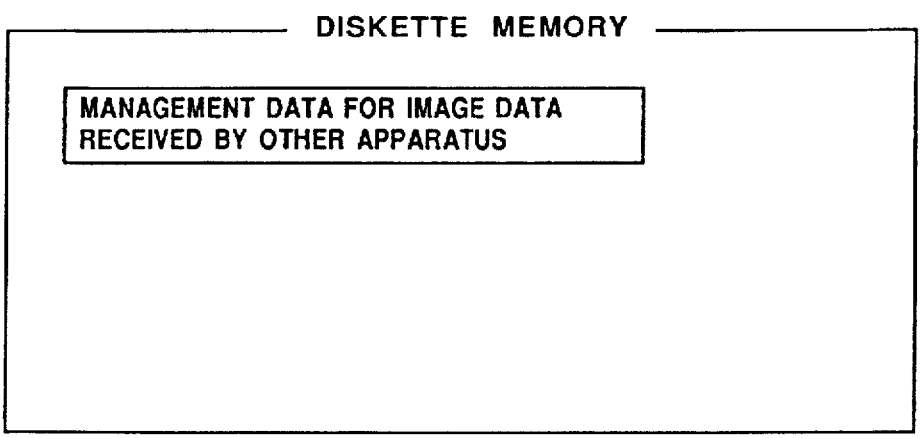
F I G. 11B
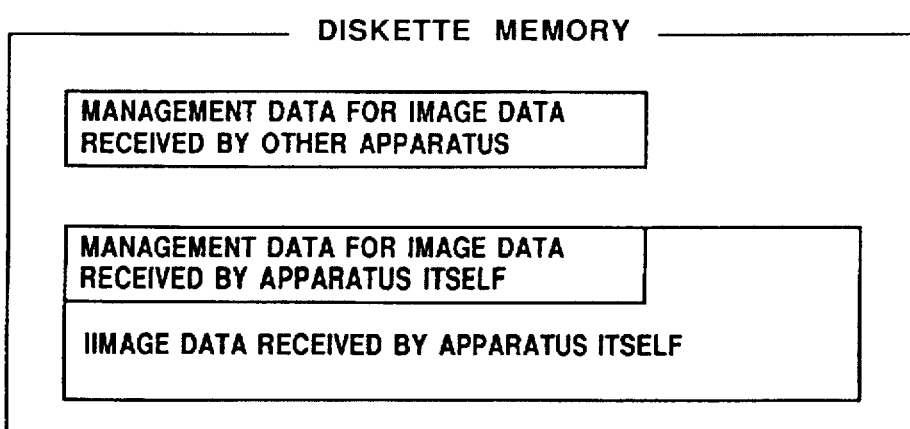
F I G. 11C

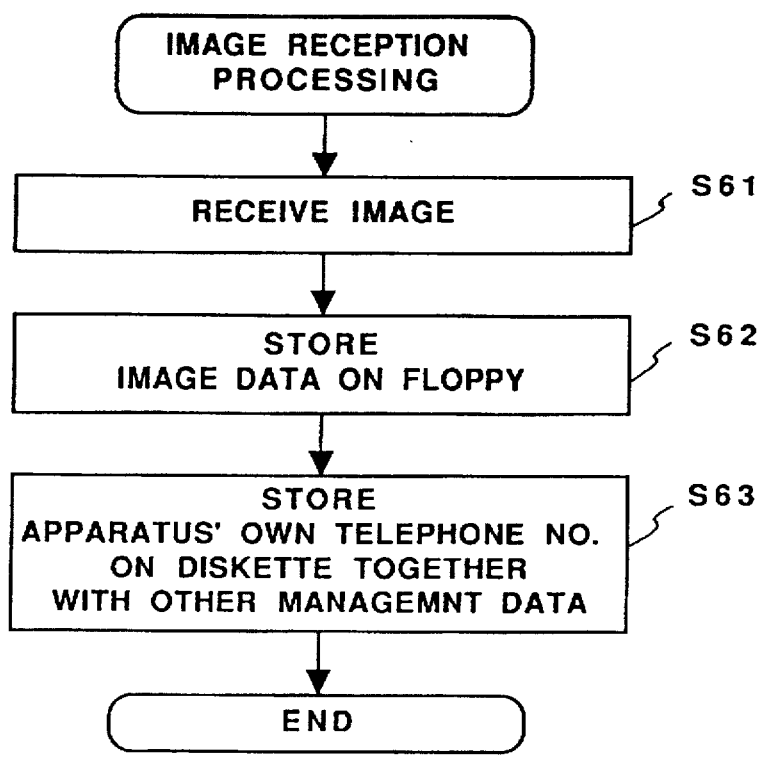
F I G. 12
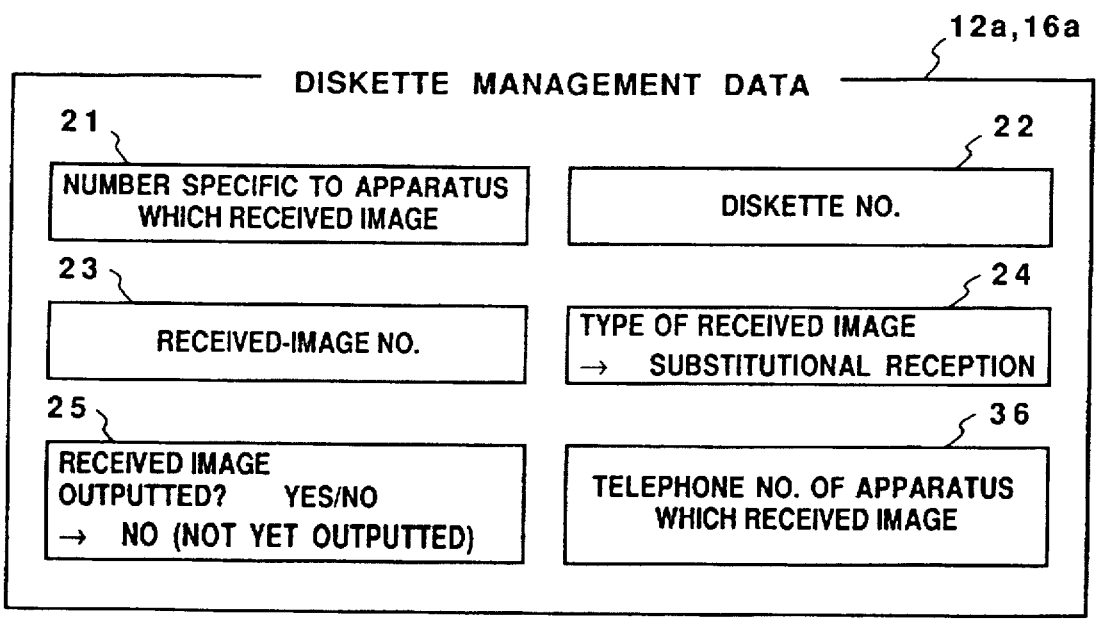
F I G. 13

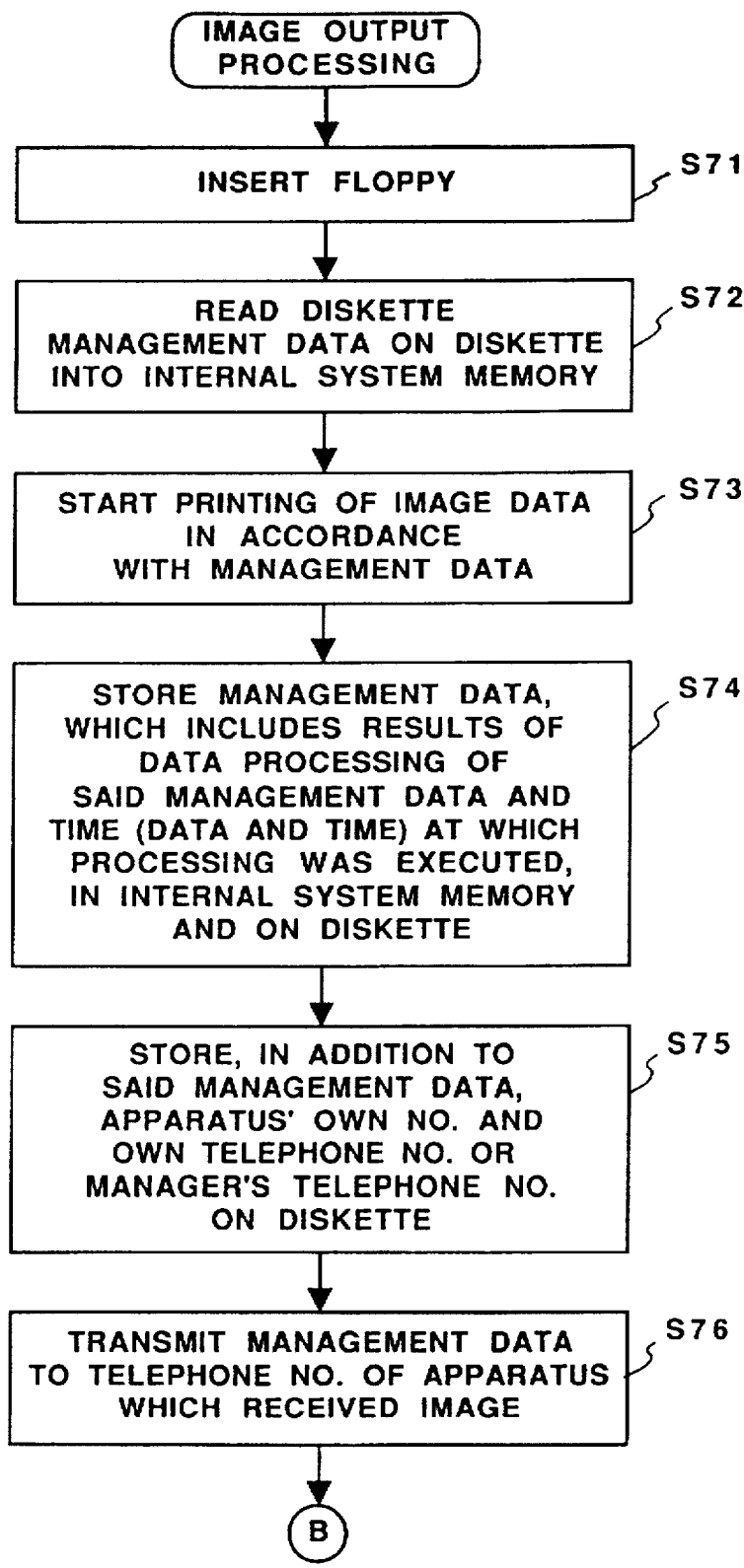
F I G. 14A

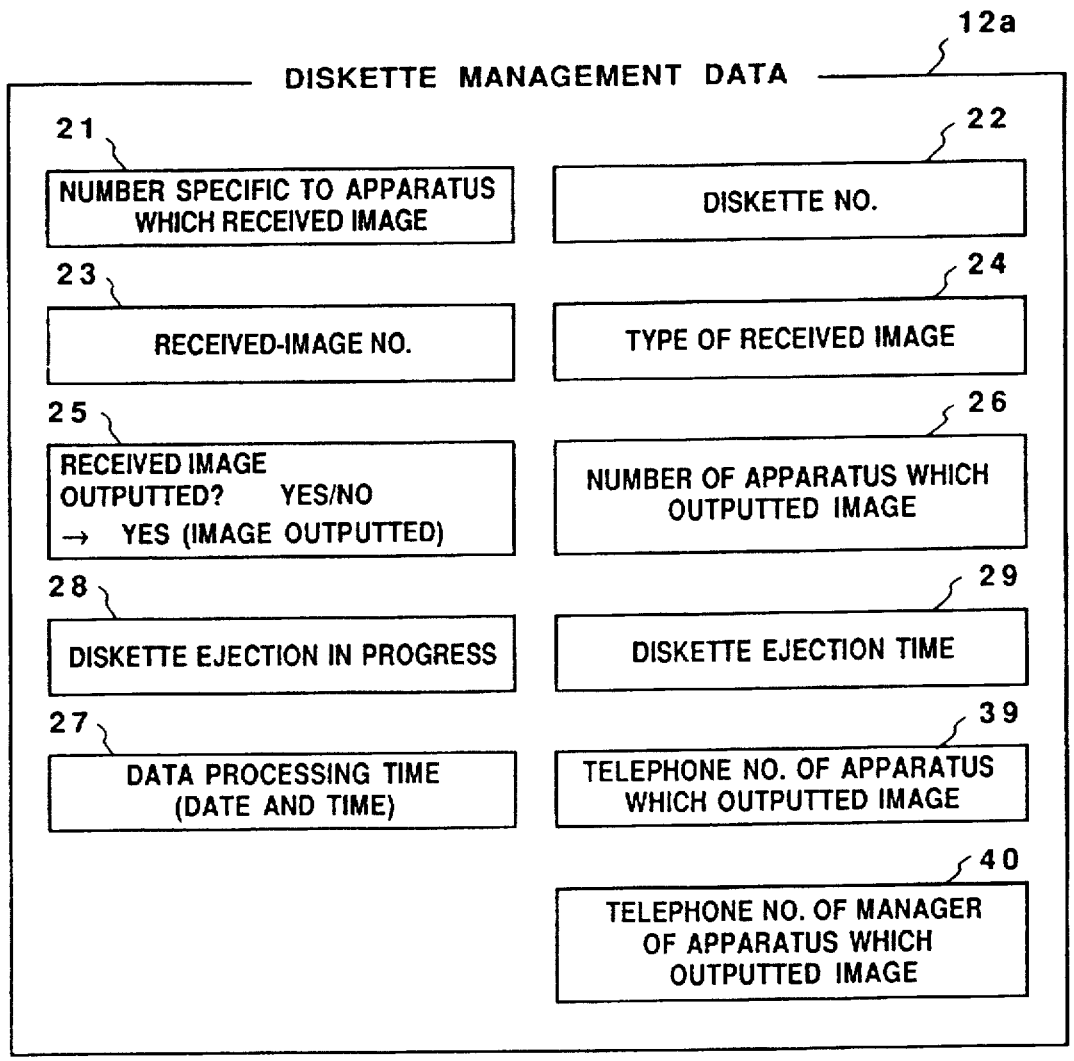
F I G. 16

DATA COMMUNICATION APPARATUS AND METHOD OF MANAGING RECEIVED DATA

BACKGROUND OF THE INVENTION

This application is a continuation of application Ser. No. 08/280,138 filed on Jul. 25, 1994, which is a continuation of application Ser. No. 07/861,762 filed on Apr. 1, 1992.

1. Field of the Invention

This invention relates to a data communication apparatus and, more particularly, to a data communication apparatus of the type in which received data is capable of being managed upon being stored on an external storage medium that can be loaded and unloaded. The invention relates also to a method of managing the received data.

2. Description of the Prior Art

In a conventional data communication apparatus of the kind in which received data is capable of being stored on an external storage medium that can be loaded and unloaded, such as a floppy disk, the diskette storing the received data is specific to the communication apparatus which has received the data.

In this example of the prior art, therefore, the received data stored on the diskette cannot be printed out by another data communication apparatus. In addition, if the management of the received data stored on the diskette is inadequate and it is therefore attempted to print out the data using another data communication apparatus, an accident may occur in which the received data or managed data is destroyed.

Consequently, if, as the result of "substitutional reception" performed due to depletion of recording paper or a malfunction in the recording system, the data has been stored on an unloadable storage medium such as a floppy disk which can be ejected from the data communication apparatus while it preserves the data, it is impossible to print out the received data on another data communication apparatus having a normal recording system. The "substitutional reception", herein, represents that image data is received and stored into a memory or a floppy disk when the recording system fails to output the image data.

Furthermore, it is impossible for a received image, which has been stored on a medium such as a floppy disk by a data communication apparatus having, say, a thermosensitive recording system, to be printed out using a data communication apparatus having a recording system which employs a laser-beam printer capable of producing high-quality images.

For these reasons, in an apparatus which stores received data on a floppy disk, the capability of a device such as a non-volatile, unloadable floppy disk and the effects gained by using such a device have not heretofore been brought out to the maximum degree.

SUMMARY OF THE INVENTION

Accordingly, an object of the present invention is to provide a data communication apparatus, as well as a method of managing received data, in which received data is managed upon being stored on an unloadable external storage medium, thereby greatly improving convenience.

According to the present invention, the foregoing object is attained by providing a data communication apparatus capable of managing received data upon storing the received data on an external storage medium that can be loaded and unloaded, comprising control means for controlling access to the external storage medium, managing means for managing received data accessed by the control means, and recording means for recording the received data managed by the managing means.

In a preferred embodiment, the received data is stored on the external storage medium if it cannot be recorded by the recording means.

In another preferred embodiment, the managing means manages information which specifies an apparatus by which the received data has been stored, information which specifies the received data, information which indicates status of recording, and information which indicates the type of the received data.

In another preferred embodiment, the recording means records the received data if the received data managed by the managing means was stored by another apparatus and has not yet been recorded.

In another preferred embodiment, the apparatus further comprises timekeeping means for clocking time, and notification means for notifying of the time at which the external storage medium was unloaded, and of the fact that the storage medium has been unloaded, based upon time clocked by the timekeeping means.

Another object of the present invention is to provide a data communication apparatus, as well as a method of managing received data, in which a floppy disk storing received data may be managed by a plurality of apparatus, thereby making it possible to output the received data and to readily ascertain the status of the floppy disk.

According to the present invention, the foregoing object is attained by providing a data communication apparatus having an external storage device, in which received data is capable of being stored in an unloadable external storage medium, comprising storing means for storing information, capable of being communicated to the apparatus itself, in the external storage medium along with the received data, and notification means which, upon receiving information from another apparatus relating to the external storage medium, gives notice of this information.

In another aspect of the invention, the foregoing object is attained by providing a data communication apparatus having an external storage device, in which data stored on an unloadable external storage medium is capable of being outputted, comprising transmitting means for transmitting a result of data output and identification information indicative of the apparatus itself to an apparatus which has received data, based upon communication information already stored on the external storage medium.

According to the present invention, the foregoing object is attained by providing a received-data managing method in a reception system capable of storing received data on an unloadable external storage medium and of outputting the received data by a second apparatus other than a first apparatus which originally received the data, characterized in that the first apparatus stores information, which is capable of being communicated to the first apparatus itself, on the external storage medium along with the received data, and the second apparatus, which has outputted the received data, transmits results of output, as well as information capable of identifying the first apparatus itself, to the first apparatus based upon information capable of being communicated to the first apparatus.

The information capable of identifying the first apparatus itself contains information capable of being communicated to the first apparatus itself.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating the construction of a facsimile apparatus embodying the present invention;

FIG. 3 is a flowchart illustrating reception processing according to this embodiment;

FIG. 10 is a diagram illustrating the content of management data when a diskette is ejected;

FIGS. 11A, 11B and 11C are diagrams illustrating the data in a diskette according to this embodiment;

FIG. 12 is a flowchart illustrating reception processing according to a preferred embodiment;

FIG. 13 is a diagram illustrating the content of management data according to a preferred embodiment;

FIG. 16 is a diagram illustrating the content of management data when a diskette is ejected according to a preferred embodiment.

DESCRIPTION OF THE PREFERRED EMBODIMENTS

Figure 2:
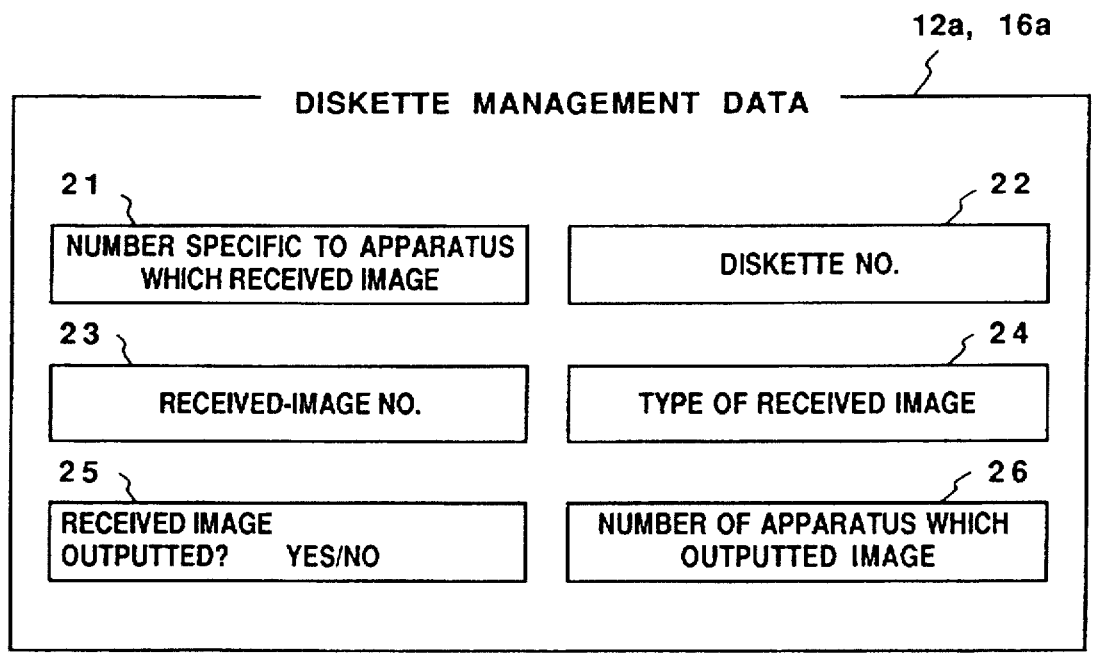
FIG. 2 is a diagram illustrating the constitution of management data according to this embodiment.

In this embodiment, a facsimile apparatus for communicating an image will be described as an example of a data communication apparatus. It goes without saying that the present invention is not limited to communication of an image but is capable of communicating a wide variety of data and signals.

(I) Construction of facsimile apparatus according to this embodiment

FIG. 1 is a block diagram of a facsimile apparatus according to this embodiment. It should be noted that a facsimile apparatus which receives an image and a facsimile apparatus which outputs an image both have the same construction.

Shown in FIG. 1 are an original document reading unit 1 for reading a transmitted original document and converting the same into image data, a recording unit 2 for outputting a received image, a report of results of communication, etc., a network control unit (NCU) 3 for connecting a telephone line to the facsimile apparatus, a modulator/demodulator (modem) 4, a modem control unit 5 for controlling the modem 4, a control panel 6, a display unit 7 for displaying the status of the facsimile apparatus as well as management data of a diskette and internal system memory, keys 8 provided on the control panel 6 so that the user may instruct the facsimile apparatus to perform various operations, and a sensor 9 for sensing the status of the facsimile apparatus.

Numeral 10 denotes a memory unit having an image memory 11 for storing received image data and the like. The image memory 11 performs the function of a buffer for receiving image data when received image data stored on a floppy disk is transferred to the recording unit 2. The memory unit 10 further includes a system RAM (or system memory) 12 which stores diskette management data 12a. The system RAM 12 is backed up by a battery so that the stored diskette management data will not be destroyed if power is cut off, as in the event of a power failure. Also included in the memory unit 10 is a ROM 13 which decides the specifications of the facsimile apparatus. The ROM 13 stores programs for executing processing procedures.

Also shown in FIG. 1 are a floppy disk controller (FDC) 14, a floppy disk drive (FDD) 15, a floppy disk medium (diskette) 16 for storing received image data 16b and diskette management data 16, etc., a timekeeping IC 17 backed up by a battery or the like so as to be capable of operating even when power is cut off, as in the event of a power failure, and a central processing unit (CPU) 20 for controlling the facsimile apparatus in accordance with the programs stored in the ROM 13.

(II) Example of operation of facsimile apparatus according to this embodiment

FIG. 2 is a diagram showing the constitution of the management data stored on the diskette 16. As shown in FIG. 2, the management data is composed of an area 21 for storing a number, such as the production number, specific to the apparatus which has received the image data and stored the received image data on the diskette 16, an area 22 which stores the number of the diskette assigned by the receiving apparatus when the diskette 16 was subjected to initial setting, an area 23 which stores the number of a received image assigned by the apparatus which received the image, an area 24 which stores data indicating the type of received image, i.e., data indicative of substitutional reception or the like, an area 25 which stores received-image output data indicating whether a stored received image has been outputted, and an area 26 which, in a case where a received image has been printed out by another apparatus, stores data, such as an apparatus production number, which is for judging what apparatus has printed out the received image. Data having the same content as the above-described management data is stored in the system memory 12 (FIG. 1) as well. This data is backed up by a battery to preserve it in case power is cut off to the apparatus.

The operation of the facsimile apparatus of this embodiment constructed as set forth above will now be described with reference to the related drawings.

First, the operation through which received image data is stored on the diskette 16 will be described in accordance with the flowchart of FIG. 3. When the NCU detects an incoming call from another party's apparatus via a line, not shown, the CPU 20 controls the modem control unit 5 to start image-data reception processing in accordance with a facsimile transmission procedure. At step S1 of the flowchart, it is determined whether the facsimile apparatus has recording paper. If recording paper is present, the received image data is printed out on the recording paper. If there is no recording paper, however, the program returns to step S2, at which substitutional reception is performed to store the image in the image memory 11. If the image memory 11 runs out of residual capacity during the course of reception (NO at step S3), the program proceeds to step S3 to error processing. On the other hand, if memory capacity is adequate and reception of all of the image data ends (YES at step S4), then the program proceeds from step S4 to step S5, at which it is determined whether the diskette 16 has any memory capacity remaining. If the result is that the diskette 16 does not have enough capacity left to store the received image data (NO st step S5), then the program proceeds to step S6, at which the display unit 7 is made to display a message to the effect that the capacity of the diskette 16 is insufficient. Processing is then terminated.

Figure 8:
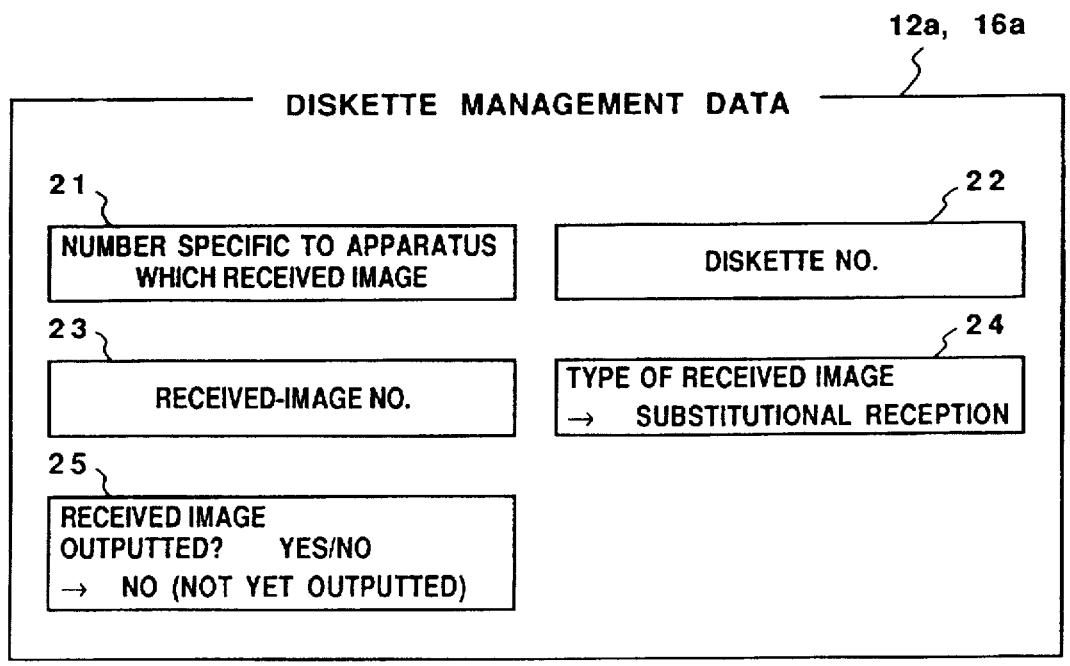
FIG. 8 is a diagram illustrating the content of management data when storage is performed by substitutional reception.

If it is found at step S5 that the diskette has enough residual capacity, then the program proceeds to step S7, at which the received image data is transferred from the image memory 11 to the diskette 16. When the transfer of all data is completed, the program proceeds from step S8 to step S9, where management data of the kind shown in FIG. 8 is created and stored on the diskette 16. More specifically, a code indicative of substitutional reception is stored in the area 24 for the type of received image, and a code indicating "NO" (namely that the image data has not been outputted) is stored in the area 25. The created data is stored as management data in the system memory 12 as well.

By thus storing the received image data on a floppy disk in advance, the data can be preserved on the diskette 16 even if power to the facsimile apparatus is cut off. In addition, if the diskette 16 runs out of residual storage capacity, merely replacing the diskette makes it possible to increase the memory capacity of the facsimile apparatus without limit.

Next, processing executed when the diskette 16 on which image data has been stored by substitutional reception is inserted will be described in accordance with the flowcharts shown in FIGS. 4 through 7.

Figure 4:
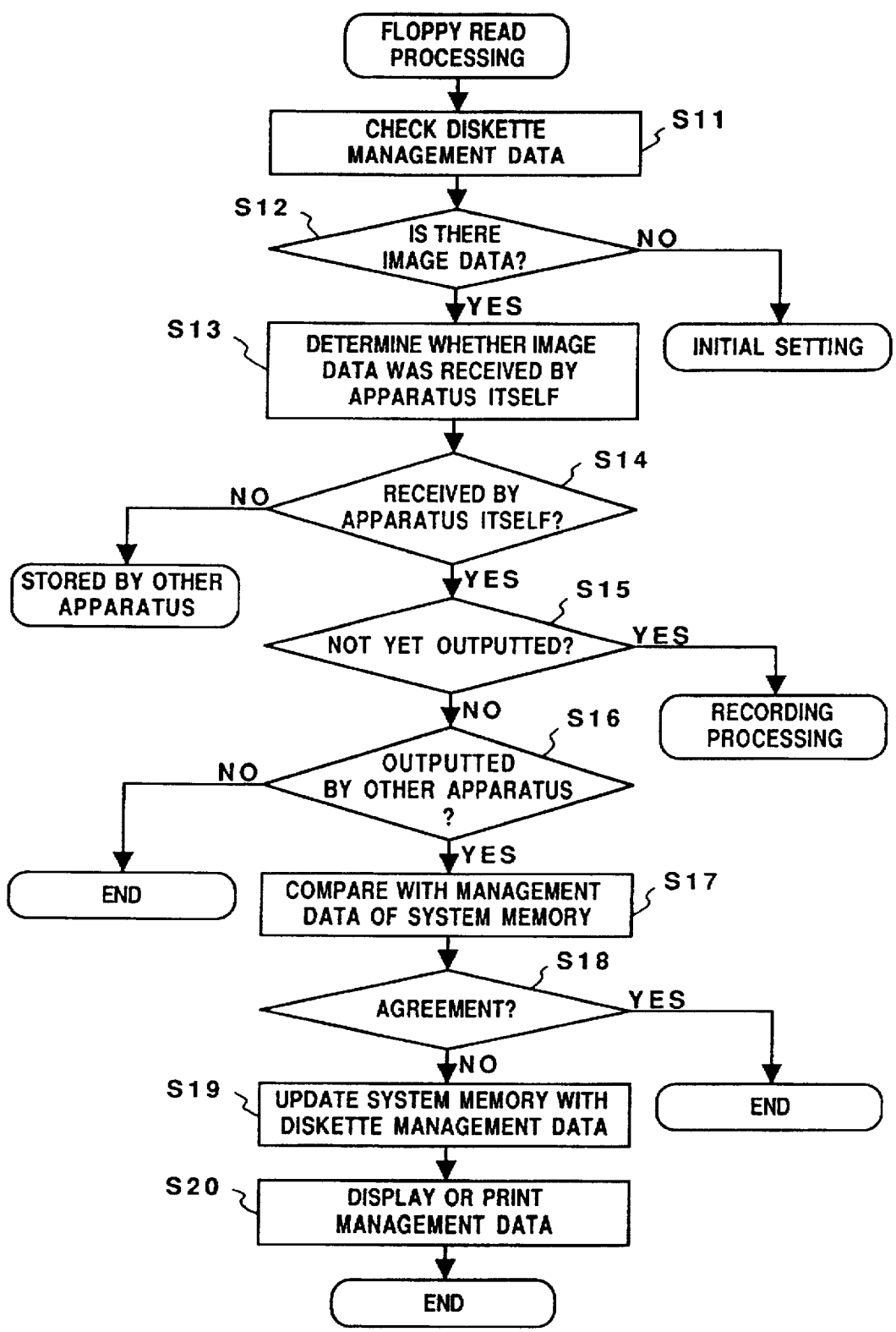
FIG. 4 is a flowchart illustrating processing when a diskette is inserted.

First, when insertion of the diskette 16 has been detected by the FDC 14, the CPU 20 causes processing to proceed to step S11 in FIG. 4. Here it is determined whether there is any stored data on the inserted diskette 16. This processing involves reading the management data on the diskette 16 and determining whether a number indicative of the image data has been stored in the area 23 for the received-image number. The result is judged at step S12. If it is found here that there is no recorded data, then the program proceeds to initial setting processing shown in FIG. 6. The initial setting processing is executed in order to use the diskette 16 afresh as a memory for storing a received image. At steps S41 and S42 in FIG. 6, the number specific to the apparatus which will receive the image, and the diskette number assigned to the diskette 16 by the apparatus, are stored in the management data areas 21 and 22, respectively, shown in FIG. 2. This is followed by step S43, at which this information, as well as management data which indicates the presence of the diskette 16 having the above-mentioned numbers and the fact that this diskette is presently inserted in the apparatus, is stored in the system memory 12.

If it is found at step S12 in FIG. 4 that stored data is present in the diskette 16, then the program proceeds to step S13. Here reference is made to the management-data area 21, which stores the number specific to the apparatus which received the image data, to determine whether this image data was received by the apparatus itself. If the result of the determination, made at step S14, is that the image data is not image data that was received by the apparatus itself, then the program proceeds to processing (shown in FIG. 5 and described later) for printing out image data that was stored on the diskette by another apparatus. If the result of the determination at step S14 is that the image data is image data that was received by the apparatus itself, then the program proceeds to step S15. Here reference is made to the management-data area 25, which indicates whether the received image has been outputted, to determine whether the image data has been outputted. If the result is that the image data has not been outputted, then the program proceeds to recording processing, described later. On the other hand, if the answer at step S15 is NO, meaning that the image data has been outputted, then the program proceeds to step S16. Here reference is made to the management-data area 26, which stores the number of the apparatus that has outputted the image data, to determine whether the image data has been outputted by the apparatus itself. If the result of the determination is that the apparatus itself has outputted the image data, processing is terminated. If the image data has been outputted by another apparatus, however, the program proceeds from step S16 to step S17, at which the management data in the system memory 12 shown in FIG. 1 is compared with the management data stored on the diskette 16. It is determined at step S18 whether there is agreement between the compared management data. If there agreement, processing is terminated. If there is no agreement, the program proceeds to step S19, at which the management data on the diskette 16 is stored in the system memory 12, thereby updating the system memory. Next, at step S20, the content of the stored management data is displayed on the display unit 7 or printed out by the recording unit 2, thereby informing the user of the updated data. Processing is then terminated.

Figure 5A:
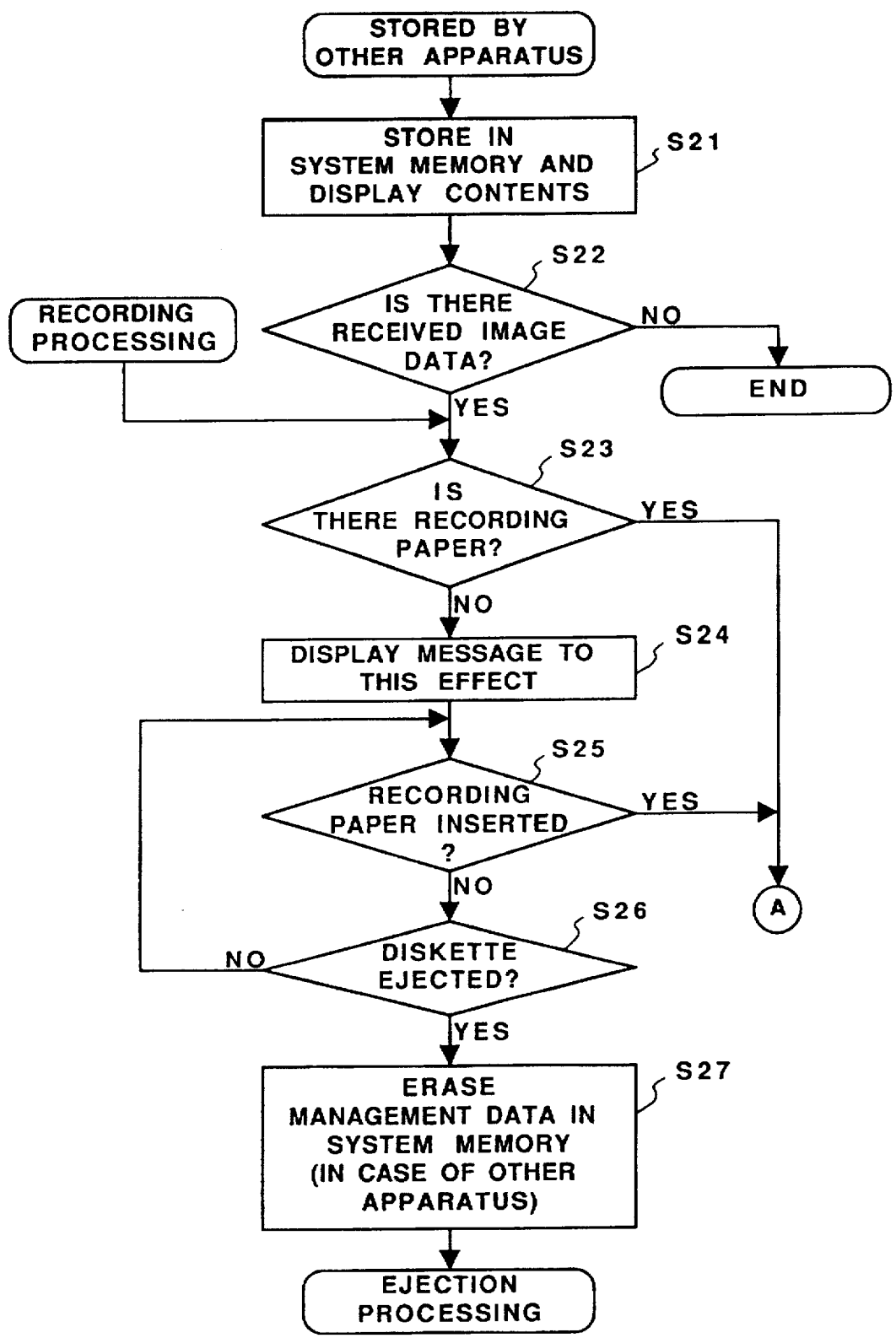
FIG. 5 is a flowchart illustrating processing for printing data stored in another apparatus.
Figure 5B:
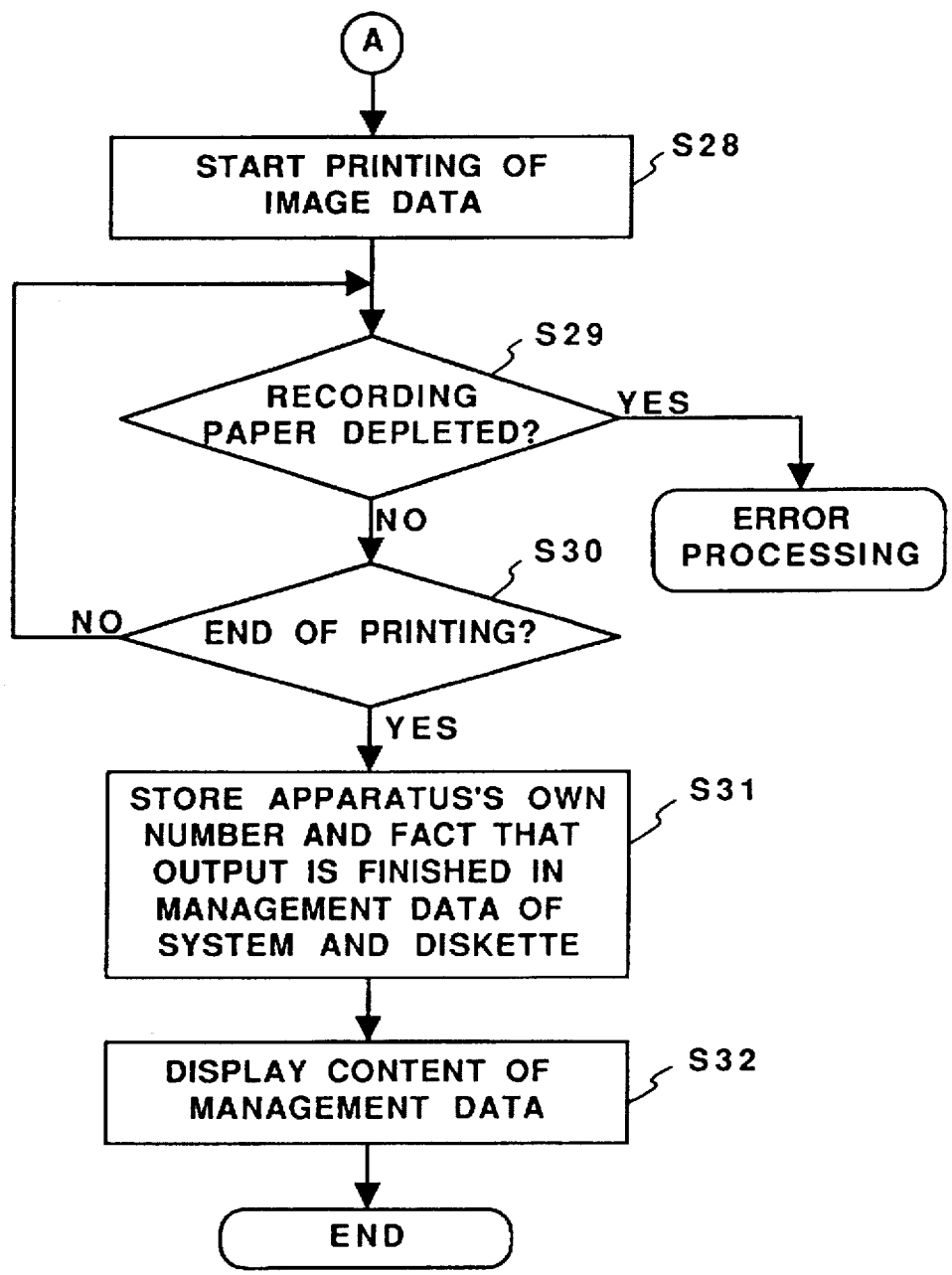
Figure 6:
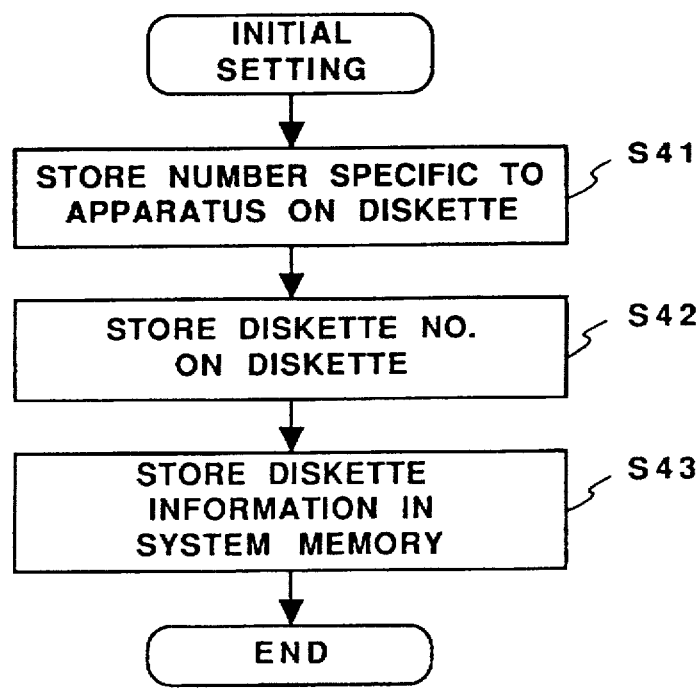
FIG. 6 is a flowchart illustrating processing for initial setting of a diskette.

If the decision made at step S14 in FIG. 4 is that the image data was recorded on the diskette 16 by another apparatus, the processing of FIG. 5 is executed. This will now be described in accordance with the flowchart of FIG. 5.

First, at step S21 in FIG. 5, the management data on the diskette 16 is stored in the system memory 12 and the content of this data is displayed on the display unit 7. Next, at step S22, reference is made to the management-data area 24, which stores the type of received image, to determine whether the image data was received by substitutional reception. If the image data was not received by substitutional reception, then processing is terminated. On the other hand, if the image data was received by substitutional reception, the program proceeds to step S23 so this data may be recorded. It is determined at step S23 whether recording paper has been installed in the recording unit 2. If recording paper has not been installed, the program proceeds to step S24, at which a message to this effect is displayed on the display unit 7. Thereafter, installation of the recording paper is awaited at steps S25, S26. If the diskette 16 is ejected during this processing, the program proceeds from step S26 to step S27, where the management data in the system memory 12 is erased. This is followed by processing, shown in FIG. 7, for ejecting the diskette.

Figure 7:
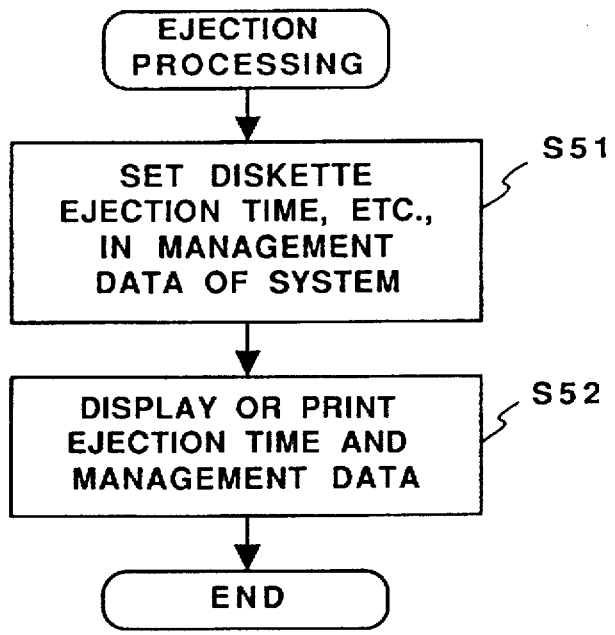
FIG. 7 is a flowchart illustrating processing for ejecting a diskette.

The ejection processing of FIG. 7 includes a step S51, at which information indicating that the diskette 16 has been ejected, as well as the time of ejection, is stored as management data in the system memory 12. Here a code indicating that ejection is in progress is set in a management-data area 28 (FIG. 10), which is for storing data indicating the diskette is being ejected, and the time inputted from the timekeeping IC 17 is set in a diskette-ejection time area 29, also shown in FIG. 10. Next, at step S52, the content of the management data is displayed on the display unit 7 or printed out by the recording unit 2, thereby informing the user. In connection with step S52, it is possible to adopt an arrangement in which depression of a prescribed one of the keys 8 is awaited before the display or print-out is made.

Figure 9:
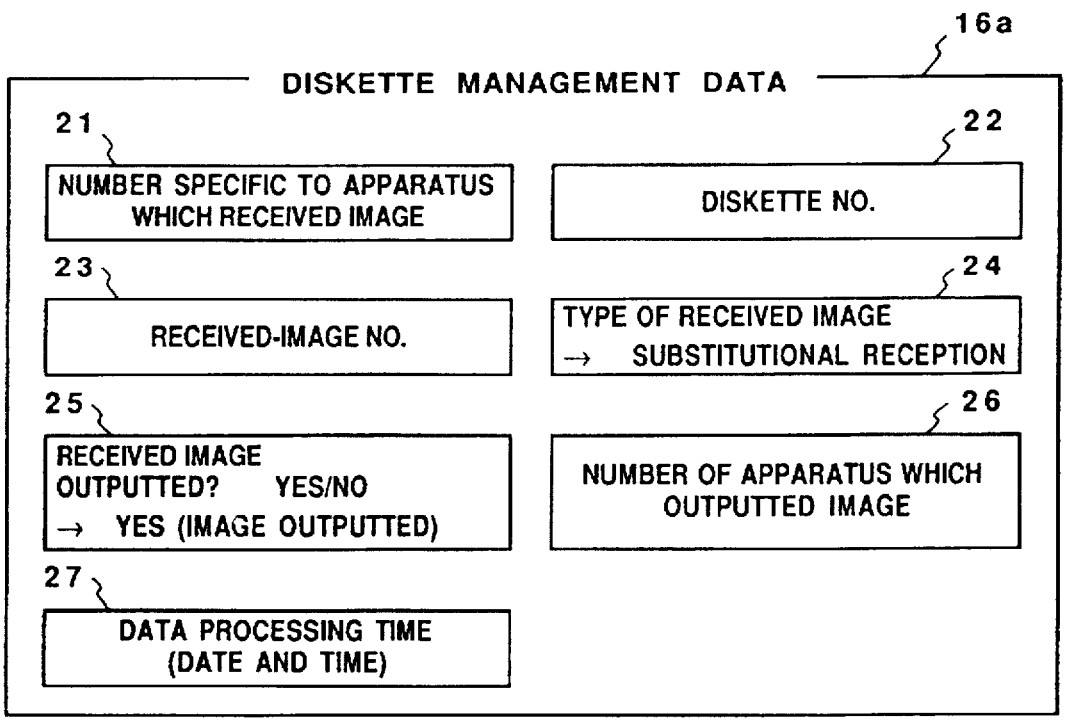
FIG. 9 is a diagram illustrating the content of management data when processing is performed for printing image data.

If recording paper has been installed in connection with the processing of steps S23 and S25 in FIG. 5, then the program proceeds to step S28, at which the recording unit 2 is started to begin printing the image data. Next, at step S29, the remainder of the recording paper is checked. If there is too little remaining paper, printing is halted and prescribed error processing is executed. If printing has ended (YES at step S30), however, the program proceeds from step S30 to step S31, where prescribed information is stored in the management data of the system memory and in the management data on the diskette 16. More specifically, the number of the apparatus itself is set in the area 26, which is for storing the number of the apparatus that has outputted the received image data, and a code representing that output has already been performed is set in the area 25, which is for indicating whether a received image has been outputted or not. In addition, the time at which the image data was printed is inputted from the timekeeping IC 17 and set in a processing-time area 27, shown in FIG. 9. Following step S31, the program proceeds to step S32, at which the content of the management data shown in FIG. 9 is displayed on the display unit 7, followed by the end of processing.

FIGS. 11A through 11C which illustrate the image data on the above-described diskette. FIG. 11A is a diagram illustrating management data and its image data received and stored by another apparatus through substitutional reception. FIG. 11B is a diagram showing the status of this data after it has been printed out by recording processing. FIG. 11C is a diagram showing the state which prevails when the image data was received and stored by the apparatus itself (i.e., not by another apparatus).

In accordance with this embodiment, as described above, the following advantages are obtained:

(1) By performing control in such a manner that received image data stored on a floppy disk is capable of being outputted by another image-data communication apparatus, it is possible for an image received by an apparatus having a different recording system, such as a thermosensitive-type image-data communication apparatus, to be outputted by a laser-beam printer capable of high-quality printing. This make it possible to bring out, to the maximum degree, the capabilities and advantages of a non-volatile, unloadable floppy disk.

(2) When a received image cannot be printed on recording paper because the recording paper in the receiving apparatus has run out or because of a malfunction in the recording system, the received image data is accumulated on a floppy disk by so-called substitutional reception, namely reception in which received image data is accumulated in memory. As a result, it is possible for the user to output the image data, which has been received in this manner, by using another image-data communication apparatus.

(3) Along with the received image data, management data which includes a number specific to the apparatus which received the image data, the number of the diskette, the number of the received image data and the type of received image data, such as data indicating that the data was received by substitutional reception, is stored on the diskette and in the system memory. In a case where the floppy disk has been ejected from the apparatus, the management data that has been stored in the system memory is not erased owing to battery back-up. Therefore, the fact that a diskette ejected from the apparatus is present, as well as the management information of the ejected diskette, can be correctly ascertained. This makes it possible to prevent runaway of the apparatus caused by ejection of the diskette and to access the floppy disk correctly even in a case where the diskette has been reloaded upon being temporarily ejected.

In addition, the same management information is stored also on the ejected diskette. Consequently, when this diskette is loaded in another image-data communication apparatus, this apparatus is capable of correctly ascertaining the information stored on the diskette and of executing the appropriate processing.

(4) The image-data communication apparatus is provided with a clock. When the floppy disk is ejected from the apparatus, the time at which the ejection took place is stored in the internal system memory, and the management data stored on the diskette and in the system memory and indicating the ejection time and the fact that ejection took place is displayed on or printed out by the communication apparatus. Consequently, if the diskette has been accidentally or intentionally taken away, the user is capable of immediately determining who took the diskette and can promptly take measures to search for the it.

In particular, in case of a diskette storing data received by substitutional reception, namely data stored on a floppy disk and not recorded on recording paper, a major problem would arise if the diskette were taken away or lost. This embodiment of the invention is especially effective in preventing such a problem from occurring.

(5) Furthermore, a diskette is inserted into the image-data communication apparatus and the management data that has been stored on the diskette is checked. If received image data received and stored on the floppy disk by the apparatus itself has been outputted by another image-data communication apparatus, this is sensed and the user of the image-data communication apparatus is made aware, by a display or printout, of the fact that the received data has been outputted. As a result, in a case where a received image directed to a first user has been outputted by a second user without the first user's knowledge, the first user need not output the received image data again but is capable of searching for and verifying the received image outputted by the second user.

(6) In a case where the received data is image data received through substitutional reception and has been outputted by another image-data communication apparatus, it is possible to eliminate a needless second output of the same image data by refraining from printing out the image received through substitutional reception. This makes it possible to conserve recording paper and the electrical energy required for printing.

In accordance with the present invention, as described above, image data is stored on an unloadable external storage medium and managed, thereby greatly improving the apparatus and user convenience.

(III) More preferred example of operation of facsimile apparatus according to this embodiment In the example of operation described above, if received image data stored on a diskette has been outputted by another image output apparatus, this fact and information indicating what image output apparatus has outputted the image data cannot be ascertained unless the diskette is returned to the apparatus which received the image. As consequence, even if the image data has been outputted by another image output apparatus, unless the individual who is the receiver returns the diskette to the image receiving apparatus, the individual cannot verify what apparatus outputted the received image. In addition, the management data stored in the internal memory of the image receiving apparatus cannot be erased unless the diskette is returned to the image receiving apparatus. Consequently, there is the danger that the internal memory will overflow owing to the management data.

An improvement upon this problem will now be described.

When the facsimile apparatus having the construction shown in FIG. 1 stores image data on a floppy disk as by substitutional reception, the facsimile apparatus' own telephone number is stored on the floppy diskette in accordance with the flowchart shown in FIG. 12.

More specifically, when an image is received at step S61 in FIG. 12, the received image is stored on the floppy disk at step S62 and management data which includes the telephone number of the apparatus itself is also stored on the floppy disk at step S63. FIG. 13 illustrates the diskette management data stored on the diskette at this time. The same management data is stored as diskette management data 12a in the internal memory 12 (FIG. 1) of the apparatus itself.

In FIG. 13, numeral 21 denotes the number specific to the apparatus which receives the image, 22 the identification number of the received image, and 24 the type of received image which, in the case of FIG. 13, is one received through substitutional reception. Numeral 25 denotes a flag indicating whether or not the received image has been outputted. In the case of step S63, the image has merely been received, and therefore the flag indicates that the image has not yet been outputted. Numeral 36 denotes the apparatus's own telephone number stored at step S63.

Figure 14B:
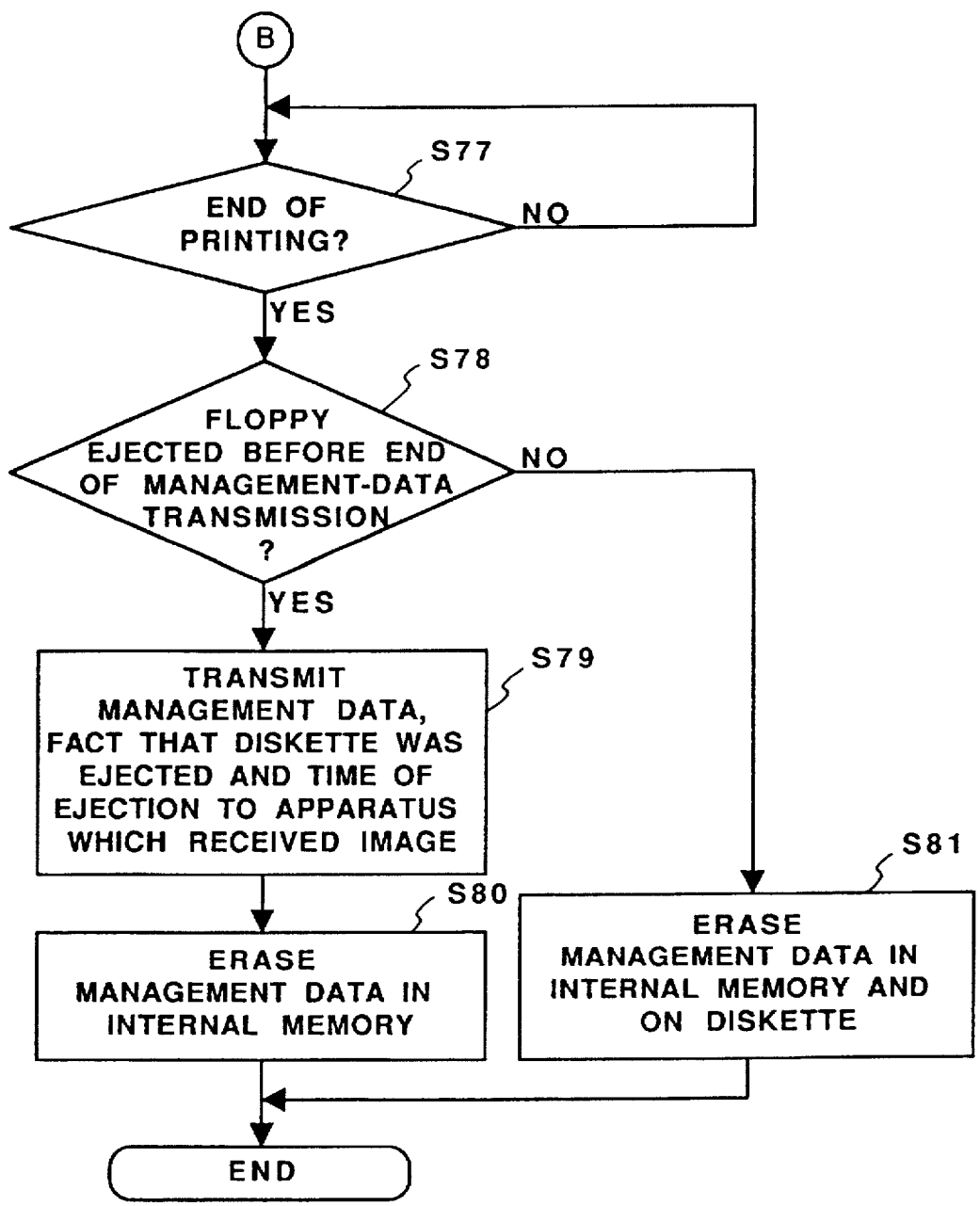
FIG. 14 is a flowchart illustrating output processing according to a preferred embodiment.

Next, if the diskette is ejected and the image is outputted by another facsimile apparatus having the construction shown in FIG. 1, then the fact that the image has been outputted and the time this took place are added onto the diskette management data 12a of FIG. 1 in accordance with the flowchart of FIG. 14. In addition, the facsimile apparatus which has outputted the image adds its own apparatus number as well at its own telephone number of its own manager's telephone number onto the management data on the diskette, thereby updating this management information. Thereafter, this management data is transmitted via communication to the earlier mentioned apparatus that received the image.

In FIG. 14, the floppy disk is inserted at step S71, whereupon diskette management data 16a on the diskette 16 is written in the diskette management data 12a within the system RAM 12 at step S72. The output of the received image data 16b is started in accordance with the management data at step S73. Next, at step S74, the fact that output has been performed and the time this took place are added onto the diskette management data 12a, 16b. This is followed by step S75, at which the apparatus number of the apparatus itself (the facsimile apparatus which has outputted the image) as well as the telephone number of this apparatus or the telephone number of this apparatus' manager is added to the management data. At the same time, reference is made to the telephone number 36 (FIG. 13) of the apparatus which received the image, whereby the diskette management data is transmitted at step S76 to the facsimile apparatus which received the image.

Figure 15:
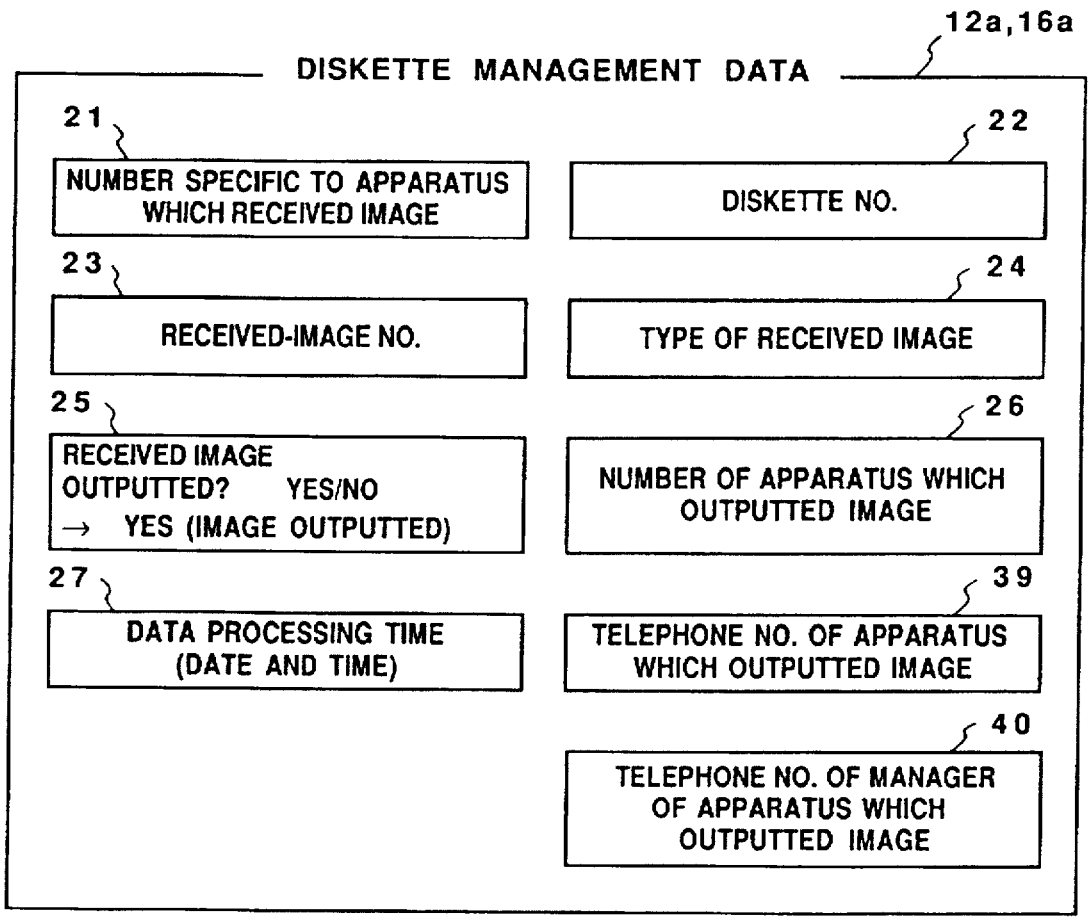
FIG. 15 is a diagram illustrating the content of management data when processing is performed for printing image data by another apparatus according to a preferred embodiment.

The management data on the diskette at this time is as shown in FIG. 15. In the diskette management data of FIG. 15, the flag 25 representing whether or not the received image has been outputted is updated to indicate that the image has been outputted, the telephone number 36 of the apparatus which received the image is deleted, and the apparatus number 26, telephone number 39 and manager's telephone number 40 of the facsimile apparatus which outputted the image, as well as the time at which the data was outputted, are added.

The end of output is awaited at step S77. When the diskette is ejected after the image has been outputted, it is determined at step S78 whether the ejection of the diskette took place before or after the end of transmission of the management data. If ejection took place before the end of transmission, then, as step S79, the fact that ejection took place and the time of ejection are added onto the diskette management data 12a of FIG. 1 and this information is transmitted to the facsimile apparatus which received the image.

FIG. 16 illustrates the management data at this time. It will be seen that the flag 28 indicating that ejection is in progress and the ejection time 29 have been added to the diskette management data in FIG. 16.

It is is found at step S78 in FIG. 14 that ejection of the floppy disk took place after transmission of the management data, then the management data in the internal memory and the management data on the disketted is erased in conformity with the state of the management data.

Figure 17:
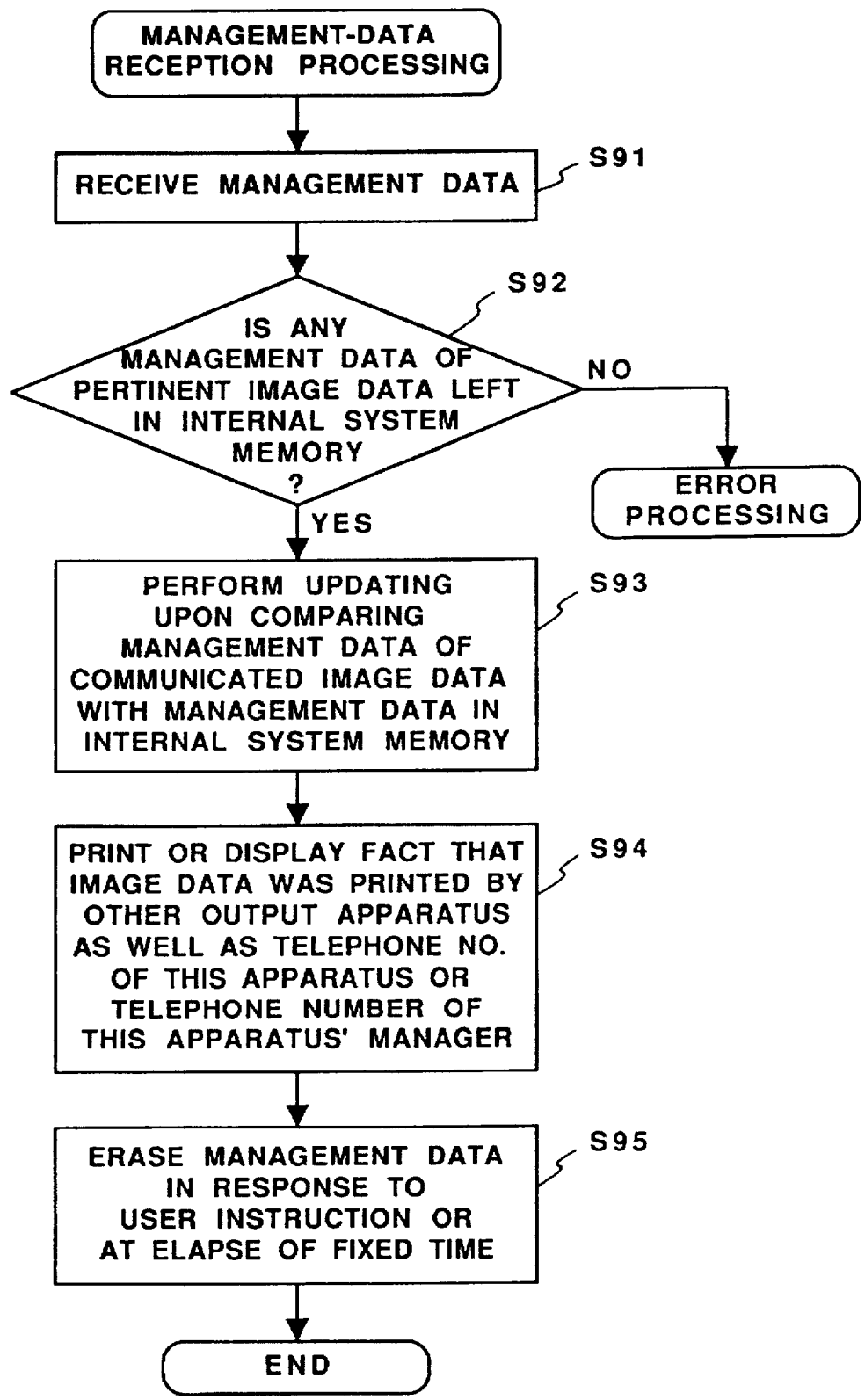
FIG. 17 is a flowchart illustrating processing for receiving management data according to a preferred embodiment.

When the facsimile apparatus which has received the image receives the diskette management data, an operation in accordance with FIG. 17 is executed. Specifically, the management data is updated, the user is notified by a display or printout, and the management data is erased. This will now be described in greater detail.

In FIG. 17, management data is received at step S91 and it is determined at step S92 whether management data of the pertinent image data remains in the internal memory. If management data remains, then the program proceeds to step S93, at which this data is updated after being compared with the received management data. This is followed by step S94, at which the user is informed, by a printout or display, of the fact that the received image data has been outputted by another apparatus, the telephone number or manager's telephone number of the apparatus which outputted the image, or information indicating that the disketted has been ejected. Then, at step S95, the management data is erased by an instruction from the user or after elapse of a fixed period of time.

In accordance with this preferred embodiment of the invention, the following advantages are obtained:

(1) In a facsimile apparatus (hereinafter referred to as the "first facsimile apparatus") capable of storing a received image on a floppy disk, the first facsimile apparatus' own telephone number is stored on the diskette along with the received image data. Accordingly, if the received image data is outputted by another facsimile apparatus (also referred to as the "second facsimile apparatus" where appropriate), the fact that the received image data has been outputted by the other or second facsimile apparatus is capable of being transmitted, via communication, by this second facsimile apparatus to the first facsimile apparatus that received the image.

(2) In a case where another (the second) facsimile apparatus has outputted the received image stored on the diskette, the above-mentioned telephone number is read out and the first facsimile apparatus mentioned in (1) above, namely the apparatus which originally stored the received image on the diskette, is notified of the phone number via communication, whereby the user of the first facsimile apparatus which originally received the image is capable of ascertaining that the received image has been outputted. By making it possible to erase the management data stored in the memory of the first facsimile apparatus which received the image, memory overflow is prevented.

(3) The second facsimile apparatus which has outputted the image in (2) above incorporates its telephone number or the telephone number of its manager in the notification information communicated to the first facsimile apparatus that originally stored the received image on the diskette. This makes it possible for the user of the first facsimile apparatus which originally received the image to acquire information indicating whether the received image was outputted. Alternatively, it is possible to execute processing in which the manager of the second facsimile apparatus is made to investigate the destination of the received image or to deliver the received image.

(4) If the diskette is ejected after the second facsimile apparatus mentioned in (3) above has outputted the received image, the first a facsimile apparatus in (1) which originally received the image is notified, via communication, of the fact that the image has been outputted, the ejection of the diskette and the time of ejection. As a result, it is easy for the user of the first facsimile apparatus which received the image to locate the outputted image and the diskette.

(5) In the first facsimile apparatus in (1) which originally received the image, the management data is stored on the diskette and in the internal system memory. Even if the floppy disk is ejected from this apparatus, the management data that has been stored in the system memory is not erased since the system memory is backed up. The first facsimile apparatus is capable of ascertaining via communication, from the other (second) facsimile apparatus which outputted the received image, the fact that the received image data originally stored on the diskette by the first facsimile apparatus itself has been outputted by the second facsimile apparatus, as well as the telephone number of the second facsimile apparatus or the telephone number of its manager. This information is added to the management data preserved in the internal system memory of the first facsimile apparatus. By a display or printout, the user of the first facsimile apparatus is capable of immediately ascertaining the fact that the received image which it itself stored on the diskette has been printed out by the second facsimile apparatus, as well as the telephone number of the second apparatus or the telephone number of its manager.

(6) In the second facsimile apparatus mentioned in (3) above, the image data is outputted, after which the management data for this image data is transmitted to the first facsimile apparatus, namely the apparatus which originally stored the received image on the diskette, via communication. Thereafter, the image data and the image management data stored on the diskette or in the internal memory is erased. As a result, memory overflow is prevented.

In other words, there can be provided a data communication apparatus, as well as a method of managing received data, in which a floppy disk on which image information has been stored is managed in the same fashion among a plurality of apparatus, thereby making it possible to readily ascertain the output of the received data and the status of the floppy disk.

In this embodiment, a floppy disk is adopted as the unloadable external storage medium. However, the same effects can be obtained even if another external storage medium such as a photomagnetic disk or memory card is used. In addition, the present invention may be applied to a system constituted by a plurality of apparatus or to a single apparatus. Further, it goes without saying that the invention is applicable also to a case where a program for implementing the invention is supplied to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image data communication apparatus capable of writing received image data into and reading received image data from an external storage medium that can be loaded to and unloaded from said apparatus, comprising:

receiving means for receiving image data transmitted from a party;

control means for controlling said apparatus to write the image data received by said receiving means into the external storage medium and to read from the external storage medium image data written therein;

output means for outputting the image data received by said receiving means and the image data read from the external storage medium; and managing means responsive to management data for managing the image data received and written into the external storage medium, said management data including data representing whether or not the received image data written into the external storage medium was not outputted from the external storage medium.

2. A data communication apparatus according to claim 1, wherein said control means writes the image data received by said receiving means into the external storage medium when said output means cannot output the image data received by said receiving means.

3. A image data communication apparatus according to claim 1, wherein said output means outputs said image data visually.

4. An image data communication apparatus capable of writing received image data into and reading received image data from an external storage medium that can be loaded to and unloaded from said apparatus, comprising:

receiving means for receiving image data transmitted from a party;

control means for controlling said apparatus to write the image data received by said receiving means into the external storage medium and to read from the external storage medium image data written therein;

output means for outputting the image data received by said receiving means and the image data read from the external storage medium; and managing means responsive to management data for managing the image data received and written into the external storage medium, said management data including data representing whether the image data received and written into the external storage medium has been already outputted or not, wherein said apparatus is one of a plurality of data communication apparatuses having the same functions as the first-mentioned apparatus, and wherein said management data further includes data identifying which of said plurality of apparatuses wrote into the external storage medium the image data received and written therein.

5. An image data communication apparatus according to claim 4, wherein said management data is stored in the external storage medium.

6. A image data communication apparatus according to claim 4, wherein said output means outputs said image data visually.

7. An image data communication apparatus capable of writing received image data into and reading received image data from an external storage medium that can be loaded to and unloaded from said apparatus, comprising:

receiving means for receiving image data transmitted from a party;

control means for controlling said apparatus to write the image data received by said receiving means into the external storage medium and to read from the external storage medium image data written therein;

output means for outputting the image data received by said receiving means and the image data read from the external storage medium; and managing means responsive to management data for managing the image data received and written into the external storage medium, said management data including data representing whether the image data received and written into the external storage medium has been already outputted or not, wherein said apparatus is one of a plurality of data communication apparatuses having the same function as the first-mentioned apparatus, and wherein said management data further includes data identifying which, if any, of said plurality of apparatuses has outputted the image data received and written into the external storage medium.

8. An image data communication apparatus according to claim 7, wherein said management data is stored in the external storage medium.

9. A image data communication apparatus according to claim 7, wherein said output means output said image data visually.

10. An image data communication apparatus capable of writing received image data into and reading received image data from an external storage medium that can be loaded to and unloaded from said apparatus, comprising:

receiving means for receiving image data transmitted from a party;

control means for controlling said apparatus to write the image data received by said receiving means into the external storage medium and to read from the external storage medium image data written therein;

output means for outputting the image data received by said receiving means and the image data read from the external storage medium; and managing means responsive to management data for managing the image data received and written into the external storage medium, said management data including data representing whether the image data received and written into the external storage medium has been already outputted or not, wherein said apparatus is one of a plurality of data communication apparatuses having the same function as the first-mentioned apparatus, and wherein said management data further includes second data identifying which of said plurality of apparatuses wrote into the external storage medium the image data received and written therein, and third data identifying which of said plurality of apparatus, if any, has outputted the image data received and written into the external storage medium, and wherein said management data is stored in the external storage medium.

11. An image data communication apparatus according to claim 10, further comprising transmitting means for transmitting the management data, wherein said transmitting means transmits data identifying said data communication apparatus as the third data to another apparatus identified by the second data, when the second data does not identify said data communication apparatus.

12. An image data communication apparatus according to claim 10, wherein said managing means stores the management data into a memory of said data communication apparatus and updates the management data stored in the memory based on data received by said receiving means.

13. A image data communication apparatus according to claim 10, wherein said output means outputs said image data visually.

14. A method for managing image data received by a data communication apparatus, comprising the steps of:

receiving image data;

storing the received image data into an external storage medium capable of being loaded to and unloaded from the data communication apparatus; and managing the received image data written into the external storage medium based on management data including data representing whether or not the received image data written into the external storage medium was not outputted from the external storage medium.

15. An image data managing method according to claim 14, wherein the received image data is written into the external storage medium when it cannot be output.

16. A method for managing image data received by a data communication apparatus, comprising the steps of:

receiving image data;

storing the received image data into an external storage medium capable of being loaded to and unloaded from the data communication apparatus; and managing the received image data written into the external storage medium based on management data including data representing whether or not the received image data written into the external storage medium has been outputted, wherein the apparatus is one of a plurality of data communication apparatuses having the same functions as the first-mentioned apparatus, and wherein said management data further includes data identifying which of the plurality of apparatuses wrote into the external storage medium the image data received and written therein.

17. An image data managing method according to claim 16, wherein said management data is stored in the external storage medium.

18. A method for managing image data received by a data communication apparatus, comprising the steps of:

receiving image data;

storing the received image data into an external storage medium capable of being loaded to and unloaded from the data communication apparatus; and managing the received image data written into the external storage medium based on management data including data representing whether or not the received image data written into the external storage medium has been outputted, wherein the apparatus is one of a plurality of data communication apparatuses having the same functions as the first-mentioned apparatus, and wherein said management data further includes data identifying which, if any, of the plurality of apparatuses has outputted the image data received and written into the external storage medium.

19. An image data managing method according to claim 18, wherein said management data is stored in the external storage medium.

20. A method for managing image data received by a data communication apparatus, comprising the steps of:

receiving image data;

storing the received image data into an external storage medium capable of being loaded to and unloaded from the data communication apparatus; and managing the received image data written into the external storage medium based on management data including data representing whether or not the received image data written into the external storage medium has been outputted, wherein the apparatus is one of a plurality of data communication apparatuses having the same functions as the first-mentioned apparatus, and wherein said management data further includes second data identifying which of the plurality of apparatuses wrote into the external storage medium the image data received and written therein, and third data identifying which of the plurality of apparatuses, if any, has outputted the image data received and written into the external storage medium, and wherein said management data is stored in the external storage medium.

21. An image data managing method according to claim 20, further comprising a step of transmitting said management data, wherein said transmitting step transmits data identifying the data communication apparatus as the third data to another apparatus identified by the second data, when the second data does not identify the first-mentioned data communication apparatus.

22. An image data managing method according to claim 20, wherein said managing step stores said management data into a memory of the data communication apparatus and updates said management data stored in memory based on data received in a receiving step.

23. A data communication apparatus capable of writing received data into the reading received data from an external storage medium that can be loaded to and unloaded from said apparatus, comprising:
receiving means for receiving data transmitted from a party;
control means for controlling said apparatus to write the data received by said receiving means into the external storage medium and to read from the external storage medium data written therein;
output means for outputting the data received by said receiving means and the data from the external storage medium; and
managing means responsive to management data for managing the data received and written into the external storage medium, said management data including data representing whether or not the received data written into the external storage medium was not outputted from the external storage medium.

24. A data communication apparatus according to claim 23, wherein said control means writes the data received by said receiving means into the external storage medium when said output means cannot output the data received by said receiving means.

25. A data communication apparatus according to claim 23, wherein said output means outputs said data visually.

26. A data communication apparatus according to claim 23, wherein said data is image data.

27. A data communication apparatus capable of writing received data into the reading received data from an external storage medium that can be loaded to and unloaded from said apparatus, comprising:
receiving means for receiving data transmitted from a party;
control means for controlling said apparatus to write the data received by said receiving means into the external storage medium and to read from the external storage medium data written therein;
output means for outputting the data received by said receiving means and the data read from the external storage medium; and managing means responsive to management data for managing the data received and written into the external storage medium, said management data including data representing whether the data received and written into the external storage medium has been already outputted or not,
wherein said apparatus is one of a plurality of data communication apparatuses having the same functions as the first-mentioned apparatus, and wherein said management data further includes data identifying which of said plurality of apparatuses wrote into the external storage medium the data received and written therein.

28. A data communication apparatus according to claim 27, wherein said management data is stored in the external storage medium.

29. A data communication apparatus according to claim 27, wherein said output means outputs said data visually.

30. A data communication apparatus according to claim 27, wherein said data is image data.

31. A data communication apparatus capable of writing received data into and reading received data from an external storage medium that can be loaded to and unloaded from said apparatus, comprising:
receiving means for receiving data transmitted from a party;
control means for controlling said apparatus to write the data received by said receiving means into the external storage medium and to read from the external storage medium data written therein;
output means for outputting the data received by said receiving means and the data read from the external storage medium; and
managing means responsive to management data for managing the data received and written into the external storage medium, said management data including data representing whether the data received and written into the external storage medium has been already outputted or not,
wherein said apparatus is one of a plurality of data communication apparatuses having the same function as the first-mentioned apparatus, and wherein said management data further includes data identifying which, if any, or said plurality of apparatuses has outputted the data received and written into the external storage medium.

32. A data communication apparatus according to claim 31, wherein said management data is stored in the external storage medium.

33. A data communication apparatus according to claim 31, wherein said output means outputs said data visually.

34. A data communication apparatus according to claim 31, wherein said data is image data.

35. A data communication apparatus capable of writing received data into and reading received data from an external storage medium that can be loaded to and unloaded from said apparatus, comprising:
receiving means for receiving data transmitted from a party;
control means for controlling said apparatus to write the data received by said receiving means into the external storage medium and to read from the external storage medium data written therein;
output means for outputting the data received by said receiving means and the image data read from the external storage medium; and managing means responsive to management data for managing the data received and written into the external storage medium, said management data including data representing whether the data received and written into the external storage medium has been already outputted or not, wherein said apparatus is one of a plurality of data communication apparatuses having the same function as the first-mentioned apparatus, and wherein said management data further includes second data identifying which of said plurality of apparatuses wrote into the external storage medium the data received and written therein, and third data identifying which of said plurality of apparatus, if any, has outputted the data received and written into the external storage medium, and wherein said management data is stored in the external storage medium.

36. A data communication apparatus according to claim 35, further comprising transmitting means for transmitting the management data, wherein said transmitting means transmits data identifying said data communication apparatus as the third data to another apparatus identified by the second data, when the second data does not identify said data communication apparatus.

37. A data communication apparatus according to claim 35, wherein said managing means stores the management data into a memory of said data communication apparatus and updates the management data stored in the memory based on data received by said receiving means.

38. A data communication apparatus according to claim 35, wherein said output means outputs said data visually.

39. A data communication apparatus according to claim 35, wherein said data is image data.

40. A storage medium having a program stored therein such that, when the program is executed by a machine, said machine functions as an image data communication apparatus capable of writing received image data into and reading received image data from an external storage medium that can be loaded to and unloaded from said apparatus, said apparatus comprising:

receiving means for receiving image data transmitted from a party;

control means for controlling said apparatus to write the image data received by said receiving means into the external storage medium and to read from the external storage medium image data written therein;

output means for outputting the image data received by said receiving means and the image data read from the external storage medium; and managing means responsive to management data for managing the image data received and written into the external storage medium, said management data including data representing whether or not the received image data written into the external storage medium was not outputted from the external storage medium.

41. A storage medium according to claim 40, wherein said control means writes the image data received by said receiving means into the external storage medium when said output means cannot output the image data received by said receiving means.

42. A storage medium having a program stored therein such that, when the program is executed by a machine, said machine function as an image data communication apparatus capable of writing received image data into and reading received image data from an external storage medium that can be loaded to and unloaded from said apparatus, said apparatus comprising:

receiving means for receiving image data transmitted from a party;

control means for controlling said apparatus to write the image data received by said receiving means into the external storage medium and to read from the external storage medium image data written therein;

output means for outputting the image data received by said receiving means and the image data read from the external storage medium; and managing means responsive to management data for managing the image data received and written into the external storage medium, said management data including data representing whether the image data received and written into the external storage medium has been already outputted or not, wherein said apparatus is one of a plurality of data communication apparatuses having the same functions as the first-mentioned apparatus, and wherein said management data further includes data identifying which of said plurality of apparatuses wrote into the external storage medium the image data received and written therein.

43. A storage medium according to claim 42, wherein said management data is stored in the external storage medium.

44. A storage medium having a program stored therein such that, when the program is executed by a machine, said machine function as an image data communication apparatus capable of writing received image data into and reading received image data from an external storage medium that can be loaded to and unloaded from said apparatus, said apparatus comprising:

receiving means for receiving image data transmitted from a party;

control means for controlling said apparatus to write the image data received by said receiving means into the external storage medium and to read from the external storage medium image data written therein;

output means for outputting the image data received by said receiving means and the image data read from the external storage medium; and managing means responsive to management data for managing the image data received and written into the external storage medium, said management data including data representing whether the image data received and written into the external storage medium has been already outputted or not, wherein said apparatus is one of a plurality of data communication apparatuses having the same function as the first-mentioned apparatus, and wherein said management data further includes data identifying which, if any, of said plurality of apparatuses has outputted the image data received and written into the external storage medium.

45. A storage medium according to claim 44, wherein said management data is stored in the external storage medium.

46. A storage medium having a program stored therein such that, when the program is executed by a machine, said machine function as an image data communication apparatus capable of writing received image data into and reading received image data from an external storage medium that can be loaded to and unloaded from said apparatus, said apparatus comprising:

receiving means for receiving image data transmitted from a party;

control means for controlling said apparatus to write the image data received by said receiving means into the external storage medium and to read from the external storage medium image data written therein;

output means for outputting the image data received by said receiving means and the image data read from the external storage medium; and managing means responsive to management data for managing the image data received and written into the external storage medium, said management data including data representing whether the image data received and written into the external storage medium has been already outputted or not, wherein said apparatus is one of a plurality of data communication apparatuses having the same function as the first-mentioned apparatus, and wherein said management data further includes second data identifying which of said plurality of apparatuses wrote into the external storage medium the image data received and written therein, and third data identifying which of said plurality of apparatus, if any, has outputted the image data received and written into the external storage medium, and wherein said management data is stored in the external storage medium.

47. A storage medium according to claim 46, said apparatus further comprising transmitting means for transmitting the management data, wherein said transmitting means transmits data identifying said data communication apparatus as the third data to another apparatus identified by the second data, when the second data does not identify said data communication apparatus.

48. A storage medium according to claim 46, wherein said managing means stores the management data into a memory of said data communication apparatus and updates the management data stored in the memory based on data received by said receiving means.

49. A storage medium having a program stored therein such that, when the program is executed by a machine, said machine function as a data communication apparatus capable of writing received data into the reading received data from an external storage medium that can be loaded to and unloaded from said apparatus, said apparatus comprising:

receiving means for receiving data transmitted from a party;

control means for controlling said apparatus to write the data received by said receiving means into the external storage medium and to read from the external storage medium data written therein;

output means for outputting the data received by said receiving means and the data from the external storage medium; and managing means responsive to management data for managing the data received and written into the external storage medium, said management data including data representing whether or not the received data written into the external storage medium was not outputted from the external storage medium.

50. A storage medium according to claim 49, wherein said control means writes the data received by said receiving means into the external storage medium when said output means cannot output the data received by said receiving means.

51. A storage medium according to claim 49, wherein said output means outputs said data visually.

52. A storage medium according to claim 49, wherein said data is image data.

53. A storage medium having a program stored therein such that, when the program is executed by a machine, said machine function as a data communication apparatus capable of writing received data into the reading received data from an external storage medium that can be loaded to and unloaded from said apparatus, said apparatus comprising:

receiving means for receiving data transmitted from a party;

control means for controlling said apparatus to write the data received by said receiving means into the external storage medium and to read from the external storage medium data written therein;

output means for outputting the data received by said receiving means and the data read from the external storage medium; and managing means responsive to management data for managing the data received and written into the external storage medium, said management data including data representing whether the data received and written into the external storage medium has been already outputted or not, wherein said apparatus is one of a plurality of data communication apparatuses having the same functions as the first-mentioned apparatus, and wherein said management data further includes data identifying which of said plurality of apparatuses wrote into the external storage medium the data received and written therein.

54. A storage medium according to claim 53, wherein said management data is stored in the external storage medium.

55. A storage medium according to claim 53, wherein said output means outputs said data visually.

56. A storage medium according to claim 53, wherein said data is image data.

57. A storage medium having a program stored therein such that, when the program is executed by a machine, said machine function as a data communication apparatus capable of writing received data into and reading received data from an external storage medium that can be loaded to and unloaded from said apparatus, comprising:

receiving means for receiving data transmitted from a party;

control means for controlling said apparatus to write the data received by said receiving means into the external storage medium and to read from the external storage medium data written therein;

output means for outputting the data received by said receiving means and the data read from the external storage medium; and managing means responsive to management data for managing the data received and written into the external storage medium, said management data including data representing whether the data received and written into the external storage medium has been already outputted or not, wherein said apparatus is one of a plurality of data communication apparatuses having the same function as the first-mentioned apparatus, and wherein said management data further includes data identifying which, if any, or said plurality of apparatuses has outputted the data received and written into the external storage medium.

58. A storage medium according to claim 57, wherein said management data is stored in the external storage medium.

59. A storage medium according to claim 57, wherein said output means outputs said data visually.

60. A storage medium according to claim 57, wherein said data is image data.

61. A storage medium having a program stored therein such that, when the program is executed by a machine, said machine function as a data communication apparatus capable of writing received data into and reading received data from an external storage medium that can be loaded to and unloaded from said apparatus, said apparatus comprising:

receiving means for receiving data transmitted from a party;

control means for controlling said apparatus to write the data received by said receiving means into the external storage medium and to read from the external storage medium data written therein;

output means for outputting the data received by said receiving means and the image data read from the external storage medium; and managing means responsive to management data for managing the data received and written into the external storage medium, said management data including data representing whether the data received and written into the external storage medium has been already outputted or not, wherein said apparatus is one of a plurality of data communication apparatuses having the same function as the first-mentioned apparatus, and wherein said management data further includes second data identifying which of said plurality of apparatuses wrote into the external storage medium the data received and written therein, and third data identifying which of said plurality of apparatus, if any, has outputted the data received and written into the external storage medium, and wherein said management data is stored in the external storage medium.

62. A storage medium according to claim 61, said apparatus further comprising transmitting means for transmitting the management data, wherein said transmitting means transmits data identifying said data communication apparatus as the third data to another apparatus identified by the second data, when the second data does not identify said data communication apparatus.

63. A storage medium according to claim 61, wherein said managing means stores the management data into a memory of said data communication apparatus and updates the management data stored in the memory based on data received by said receiving means.

64. A storage medium according to claim 61, wherein said output means outputs said data visually.

65. A storage medium according to claim 61, wherein said data is image data.

66. A method of controlling a data communication apparatus capable of writing received data into the reading received data from an external storage medium that can be loaded to and unloaded from the apparatus, comprising:

a receiving step for receiving data transmitted from a party;

a control step for controlling the apparatus to write the data received by said receiving step into the external storage medium and to read from the external storage medium data written therein;

an output step for outputting the data received by said receiving step and the data from the external storage medium; and a managing step responsive to management data for managing the data received and written into the external storage medium, said management data including data representing whether or not the received data written into the external storage medium was not outputted from the external storage medium.

67. A method according to claim 66, wherein said control step writes the data received by said receiving step into the external storage medium when said output step cannot output the data received by said receiving step.

68. A method according to claim 66, wherein said output step outputs said data visually.

69. A method according to claim 66, wherein said data is image data.

70. A method of controlling a data communication apparatus capable of writing received data into the reading received data from an external storage medium that can be loaded to and unloaded from the apparatus, comprising:

a receiving step for receiving data transmitted from a party;

a control step for controlling the apparatus to write the data received by said receiving step into the external storage medium and to read from the external storage medium data written therein;

an output step for outputting the data received by said receiving step and the data read from the external storage medium; and a managing step responsive to management data for managing the data received and written into the external storage medium, said management data including data representing whether the data received and written into the external storage medium has been already outputted or not, wherein the apparatus is one of a plurality of data communication apparatuses having the same functions as the first-mentioned apparatus, and wherein said management data further includes data identifying which of said plurality of apparatuses wrote into the external storage medium the data received and written therein.

71. A method according to claim 70, wherein said management data is stored in the external storage medium.

72. A method according to claim 70, wherein said output step outputs said data visually.

73. A method according to claim 70, wherein said data is image data.

74. A method of controlling a data communication apparatus capable of writing received data into and reading received data from an external storage medium that can be loaded to and unloaded from the apparatus, comprising:

a receiving step for receiving data transmitted from a party;

a control step for controlling the apparatus to write the data received by said receiving step into the external storage medium and to read from the external storage medium data written therein;

an output step for outputting the data received by said receiving step and the data read from the external storage medium; and a managing step responsive to management data for managing the data received and written into the external storage medium, said management data including data representing whether the data received and written into the external storage medium has been already outputted or not, wherein the apparatus is one of a plurality of data communication apparatuses having the same function as the first-mentioned apparatus, and wherein said management data further includes data identifying which, if any, or said plurality of apparatuses has outputted the data received and written into the external storage medium.

75. A method according to claim 74, wherein said management data is stored in the external storage medium.

76. A method according to claim 74, wherein said output step outputs said data visually.

77. A method according to claim 74, wherein said data is image data.

78. A method of controlling a data communication apparatus capable of writing received data into and reading received data from an external storage medium that can be loaded to and unloaded from the apparatus, comprising:
   a receiving step for receiving data transmitted from a party;
   a control step for controlling the apparatus to write the data received by said receiving step into the external storage medium and to read from the external storage medium data written therein;
   an output step for outputting the data received by said receiving step and the image data read from the external storage medium; and
   a managing step responsive to management data for managing the data received and written into the external storage medium, said management data including data representing whether the data received and written into the external storage medium has been already outputted or not,
   wherein the apparatus is one of a plurality of data communication apparatuses having the same function as the first-mentioned apparatus, and wherein said management data further includes second data identifying which of said plurality of apparatuses wrote into the external storage medium the data received and written therein, and third data identifying which of said plurality of apparatuses, if any, has outputted the data received and written into the external storage medium, and wherein said management data is stored in the external storage medium.

79. A method according to claim 78, further comprising a transmitting step for transmitting the management data, wherein said transmitting step transmits data identifying the data communication apparatus as the third data to another apparatus identified by the second data, when the second data does not identify the data communication apparatus.

80. A method according to claim 78, wherein said managing step stores the management data into a memory of the data communication apparatus and updates the management data stored in the memory based on data received by said receiving step.

81. A method according to claim 78, wherein said output step outputs said data visually.

82. A method according to claim 78, wherein said data is image data.

83. A data reception apparatus capable of writing received data into and reading received data from an external storage medium that can be loaded to and unloaded from said apparatus, comprising:
   receiving means for receiving data transmitted from a party;
   control means for controlling said apparatus to write the data received by said receiving means into the external storage medium and to read from the external storage medium data written therein;
   output means for outputting the data read from the external storage medium; and
   managing means responsive to management data for managing the data received and written into the external storage medium,
   wherein said apparatus is one of a plurality of data communication apparatuses having the same functions as the first-mentioned apparatus, and wherein said management data further includes data identifying which of the plurality of apparatuses wrote into the external storage medium the data received and written therein.

84. A data reception apparatus according to claim 83, wherein said control means writes the data received by said receiving means into the external storage medium when said output means cannot output the data received by said receiving means.

85. A data reception apparatus according to claim 83, wherein said management data is stored in the external storage medium.

86. A data reception apparatus according to claim 83, wherein said output means outputs the data received by said receiving means.

87. A data reception apparatus according to claim 83, wherein said output means outputs said data visually.

88. A data reception apparatus according to claim 83, wherein said data is image data.

89. A data reception apparatus according to claim 83, wherein said data reception apparatus is a facsimile apparatus.

90. A data reception apparatus according to claim 83, wherein the external storage medium is a floppy disk.

91. A data reception apparatus according to claim 83, wherein the external storage medium is a photomagnetic disk.

92. A data reception apparatus according to claim 83, wherein the external storage medium is a memory card.

93. A data reception apparatus according to claim 83, further comprising a memory for storing said management data.

94. A data reception apparatus according to claim 93, further comprising a memory for storing said identification data.

95. A data reception apparatus according to claim 83, wherein said management data includes identification data for identifying one of a plurality of data stored in the external storage medium.

96. A data reception apparatus according to claim 95, wherein said identification data is stored in the external storage medium.

97. A data reception apparatus capable of writing received data into and reading received data from an external storage medium that can be loaded to and unloaded from said apparatus, comprising:
   receiving means for receiving data transmitted from a party;
   control means for controlling said apparatus to write the data received by said receiving means into the external storage medium and to read from the external storage medium data written therein;
   output means for outputting the data read from the external storage medium; and
   managing means responsive to management data for managing the data received and written into the external storage medium,
   wherein said apparatus is one of a plurality of data communication apparatuses having the same function as the first-mentioned apparatus, and wherein said management data further includes data identifying which, if any, of the plurality of apparatuses has outputted the data received and written into the external storage medium.

98. A data reception apparatus according to claim 97, wherein said control means writes the data received by said receiving means into the external storage medium when said output means cannot output the data received by said receiving means.

99. A data reception apparatus according to claim 97, wherein said management data is stored in the external storage medium.

100. A data reception apparatus according to claim 97, wherein said output means outputs the data received by said receiving means.

101. A data reception apparatus according to claim 97, wherein said output means outputs said data visually.

102. A data reception apparatus according to claim 97, wherein said data is image data.

103. A data reception apparatus according to claim 93, wherein said data reception apparatus is a facsimile apparatus.

104. A data reception apparatus according to claim 97, wherein the external storage medium is a floppy disk.

105. A data reception apparatus according to claim 97, wherein the external storage medium is a photomagnetic disk.

106. A data reception apparatus according to claim 97, wherein the external storage medium is a memory card.

107. A data reception apparatus according to claim 97, further comprising a memory for storing said management data.

108. A data reception apparatus according to claim 97, wherein said management data includes identification data for identifying one of a plurality of data stored in the external storage medium.

109. A data reception apparatus according to claim 108, further comprising a memory for storing said data identification.

110. A data reception apparatus according to claim 108, wherein said identification data is stored in the external storage medium.

* * * * *

UNITED STATES PATENT AND TRADEMARK OFFICE
CERTIFICATE OF CORRECTION

PATENT NO. : 5,754,307

DATED : May 19, 1998

INVENTOR(S): SHIGEO MIURA

It is certified that error appears in the above-identified patent and that said Letters Patent is hereby corrected as shown below:

COLUMN 12

```
Line 28, "A image" should read --An image--;
Line 61, "A image" should read --An image--.
```

COLUMN 13

```
Line 25, "A image" should read --An image--.
```

COLUMN 14

```
Line 4, "A image" should read --An image--.
```

COLUMN 16

```
Line 44, "or" should read --of--.
```

COLUMN 17

```
Line 63, "function" should read --functions--.
```

COLUMN 18

```
Line 27, "function" should read --functions--;
Line 58, "function" should read --functions--.
```

COLUMN 19

```
Line 36, "function" should read --functions--.
```

UNITED STATES PATENT AND TRADEMARK OFFICE
CERTIFICATE OF CORRECTION

PATENT NO. : 5,754,307

DATED      : May 19, 1998

INVENTOR(S): SHIGEO MIURA

It is certified that error appears in the above-identified patent and that said Letters Patent is hereby corrected as shown below:

<u>COLUMN 20</u>

Line 1, "function" should read --functions--;
Line 37, "function" should read --functions--.

<u>COLUMN 21</u>

Line 5, "function" should read --functions--.

<u>COLUMN 23</u>

Line 2, "or" should read --of--.

Signed and Sealed this

Sixteenth Day of February, 1999

Attest:

Attesting Officer

Acting Commissioner of Patents and Trademarks